(12) United States Patent
Burkhardt

(10) Patent No.: US 9,022,639 B2
(45) Date of Patent: May 5, 2015

(54) TREATMENT ELEMENT FOR TREATING MATERIAL IN A MULTI-SHAFT WORM MACHINE AND MULTI-SHAFT WORM MACHINE

(75) Inventor: Ulrich Burkhardt, Stuttgart (DE)

(73) Assignee: Coperion GmbH, Stuttgart (DE)

( * ) Notice: Subject to any disclaimer, the term of this patent is extended or adjusted under 35 U.S.C. 154(b) by 398 days.

(21) Appl. No.: 13/498,542

(22) PCT Filed: Aug. 31, 2010

(86) PCT No.: PCT/EP2010/062660
§ 371 (c)(1), (2), (4) Date: Mar. 27, 2012

(87) PCT Pub. No.: WO2011/039016
PCT Pub. Date: Apr. 7, 2011

(65) Prior Publication Data

US 2012/0182823 A1   Jul. 19, 2012
US 2012/0320702 A9   Dec. 20, 2012

(30) Foreign Application Priority Data

Sep. 29, 2009   (EP) .................................. 09012358

(51) Int. Cl.
*B29B 7/48* (2006.01)
*B29C 47/64* (2006.01)
(Continued)

(52) U.S. Cl.
CPC ............. *B29C 47/0825* (2013.01); *B29B 7/483* (2013.01); *B29C 47/0009* (2013.01); *B29C 47/0854* (2013.01); *B29C 47/0857* (2013.01);
(Continued)

(58) Field of Classification Search
CPC ............ B29C 47/6043; B29C 47/6056; B29C 47/6062
USPC ............... 366/82, 85, 301; 425/204, 208, 209
See application file for complete search history.

(56) References Cited

U.S. PATENT DOCUMENTS 2,670,188 A * 2/1954 Erdmenger ...................... 366/97
2,814,472 A * 11/1957 Erdmenger ...................... 366/97
(Continued)

FOREIGN PATENT DOCUMENTS

DE   1180718   11/1964
DE   2526894   12/1976
(Continued)

OTHER PUBLICATIONS

Search report for companion EP case, EP 09012358.9, dated Jun. 10, 2010.
(Continued)

*Primary Examiner* — Charles Cooley
*Assistant Examiner* — Marc C Howell
(74) *Attorney, Agent, or Firm* — James B. Conte; Husch Blackwell LLP

(57) ABSTRACT

A treatment element to treat material in a multi-shaft worm machine has an outer contour with at least one outer contour portion, the associated evolute of which is a quantity of at least three points, each of the points lying outside the longitudinal axis and within the outer radius of the treatment element and two respective adjacent points having a spacing from one another, which is less than half the core radius. The treatment element ensures high flexibility during the adjustment of shear and/or extensional flows on the material to be treated.

25 Claims, 35 Drawing Sheets

(51) Int. Cl.
  *B29C 47/08* (2006.01)
  *B29C 47/38* (2006.01)
  *B29C 47/40* (2006.01)
  *B29C 47/60* (2006.01)
  *B29C 47/62* (2006.01)
  *B29C 47/00* (2006.01)

(52) U.S. Cl.
  CPC ............. *B29C 47/0861* (2013.01); *B29C 47/38* (2013.01); *B29C 47/402* (2013.01); *B29C 47/60* (2013.01); *B29C 47/605* (2013.01); *B29C 47/0881* (2013.01); *B29C 47/627* (2013.01); *B29C 47/6031* (2013.01); *B29C 47/6056* (2013.01)

(56) References Cited

U.S. PATENT DOCUMENTS

| | | | |
|---|---|---|---|
| 3,122,356 A * | 2/1964 | Erdmenger | ............... 366/85 |
| 3,216,271 A * | 11/1965 | Erdmenger | ............... 74/89.23 |
| 3,254,367 A | 6/1966 | Erdmenger et al. | |
| 3,900,187 A | 8/1975 | Loomans | |
| 4,556,324 A | 12/1985 | Tynan | |
| 5,487,602 A * | 1/1996 | Valsamis et al. | ............... 366/81 |
| 5,658,075 A | 8/1997 | Schebesta et al. | |
| 6,048,088 A * | 4/2000 | Haring et al. | ............... 366/85 |
| 6,179,460 B1 | 1/2001 | Burkhardt et al. | |
| 2004/0114455 A1* | 6/2004 | Uphus et al. | ............... 366/90 |

FOREIGN PATENT DOCUMENTS

| | | |
|---|---|---|
| EP | 0160570 | 11/1985 |
| EP | 1013402 | 6/2000 |
| EP | 1093905 | 10/2000 |
| WO | WO 95/33608 | 6/1995 |
| WO | WO 02/076707 | 10/2002 |
| WO | WO 2009/152973 | 12/2009 |
| WO | WO 2009/153003 | 12/2009 |

OTHER PUBLICATIONS

International Search Report in connection with International Application PCT/EP2010/062660, Dated Apr. 26, 2010.

* cited by examiner

TREATMENT ELEMENT FOR TREATING MATERIAL IN A MULTI-SHAFT WORM MACHINE AND MULTI-SHAFT WORM MACHINE

REFERENCES TO RELATED APPLICATIONS

This application claims the priority of European Patent Application, Serial No. 09 012 358.9, filed Sep. 29, 2009, pursuant to 35 U.S.C. 119(a)-(d), the content of which is incorporated herein by reference in its entirety as if fully set forth herein.

FIELD OF THE INVENTION

The invention relates to a treatment element for treating material in a multi-shaft worm machine, in particular in a two-shaft worm machine, comprising
 a longitudinal axis M,
 a respective core radius $R_i$ having the longitudinal axis M as the centre point and an outer radius $R_a$,
 an outer contour $A(\phi)$ running about the longitudinal axis M, wherein
 $\phi$ is the angle about the longitudinal axis M and $R_i \leq D_A(\phi) \leq R_a$ applies to a spacing $D_A(\phi)$ of the outer contour $A(\phi)$ from the longitudinal axis M.

Furthermore, the invention relates to a multi-shaft worm' machine, in particular a two-shaft worm machine with
 a housing,
 at least two housing bores, which penetrate one another and are parallel to one another,
 at least two shafts arranged concentrically in the housing bores,
  which are rotatably drivable about associated rotational axes, in particular are rotatably drivable in the same direction, and
  which have an axial spacing a of the rotational axes,
 a plurality of treatment elements for treating material,
  which are non-rotatably arranged one behind the other in an axial direction on the at least two shafts, and
  which are configured to tightly mesh with one another.

BACKGROUND OF THE INVENTION

A two-shaft worm machine with single-threaded treatment or worm elements is known from DE 1 180 718 A. The outer contour of the worm elements is composed of circular arcs in cross-section. The active flank located in the rotational direction has an outer contour, which is composed of three circular arcs, the centre points of which are either located on the outer radius or on the longitudinal axis of the worm elements. The drawback is that the worm elements only allow a small flexibility in the adjustment of the shear and/or extensional flows acting on the material to be processed.

SUMMARY OF THE INVENTION

The invention is based on an object of developing a treatment element of the generic type in such a way that a high flexibility is provided in the adjustment of the shear and/or extensional flows acting on the material to be processed.

This object is achieved by a treatment element, in which the outer contour $A(\phi)$ has at least one outer contour portion $A(\Delta\phi)$, which runs along an angle portion $\Delta\phi$,
 which has a continuously changing spacing $D_A(\Delta\phi)$ from the longitudinal axis M, wherein $R_i < D_A(\Delta\phi) < R_a$, and
 which has an associated evolute E,
  which is a quantity of n points $P(i)$ where $i=1$ to n and $n \geq 3$,
  wherein each of the points $P(i)$ lies outside the longitudinal axis M and within the outer radius $R_a$, and
  wherein two respective adjacent points $P(i)$ and $P(i+1)$ have the spacing $\Delta r(i)$ from one another, which is less than $R_i/2$.

It was recognized according to the invention that the treatment elements known from the prior art, with the same ratio of the outer radius to the core radius, have the same angle of intersection of the active flank curve with the crest curve. The inner radius of the housing bores is greater by the radial play than the outer radius of the treatment elements. A geometrically similar form of the wedge between the inner contour of the housing and the active flank curve is therefore always produced with a constant ratio of the radial play to the outer radius. As the shear and/or extensional flows prevailing in the wedge substantially depend on the geometrical form thereof, they can only be adjusted by the angle of intersection of the active flank curve with the crest curve. As the angle of intersection only depends on the ratio of the outer radius to the inner radius, the adjustment of the shear and/or extensional flows is only possible to an extremely limited extent by means of the geometry of the wedge.

In comparison, the treatment element according to the invention—viewed in cross section or in a cross sectional projection—has at least one outer contour portion $A(\Delta\phi_j)$, the associated evolute $E_j$ of which is a quantity of n points $P(i)$ wherein $i=1$ to n and $n \geq 3$, in particular $n \geq 4$ and, in particular $n \geq 5$, wherein each of the points $P(i)$ lies outside the longitudinal axis M of the treatment element and within the outer radius $R_a$ thereof. Two adjacent respective points $P(i)$ and $P(i+1)$ have a spacing $\Delta r(i)$ from one another, which is smaller than $R_1/2$, in particular smaller than $R_1/4$, in particular smaller than $R_1/6$, and in particular smaller than $R_1/8$. Adjacent points $P(i)$ and $P(i+1)$ belong to adjacent involute curves $E'(i)$ and $E'(i+1)$. The involute curves $E'(i)$, wherein $i=1$ to n together form the outer contour portion $A(\Delta\phi_j)$ belonging to the evolute $E_j$.

The index j characterizes the number of evolutes. The at least one outer contour portion $A(\Delta\phi_j)$ forms at least one part of a flank of the treatment element, the associated wedge being flexibly adjustable by means of the type and arrangement of the evolute $E_j$. Correspondingly, the shear and/or extensional flows that can be produced by the treatment element can be flexibly adapted to the material to be treated by the means of the type and arrangement of the evolute $E_j$.

The evolute $E_j$ of the associated outer contour portion $A(\Delta\phi_j)$ running in a plane is the location or the curve of the centre points of curvature or the centre points of the circle of curvature. The outer contour portion $A(\Delta\phi_j)$ belonging to the evolute $E_j$ is also called the involute. A notional rod with the length of the axial spacing a is unwound on the evolute $E_j$ to construct the outer contour, the first rod end defining the outer contour portion $A_i(\Delta\phi_{ji})$ of one treatment element and the second rod end defining an associated outer contour portion $A_{i+1}(\Delta\phi_{ji+i})$ of the further treatment element, which tightly mesh with one another when installed in a multi-shaft worm machine.

A high measure of degrees of freedom for the construction of the treatment element according to the invention is provided by the type, arrangement and number of evolutes so the outer contour portions $(\Delta\phi_j)$ can be varied with respect to their curvature, length and their angles of intersection over broad ranges. The wedges between the flanks and the inner contour of the housing can therefore be extremely flexible in design.

As the shear and/or extensional flows prevailing in these wedges substantially influence the quality of the material to be processed, the quality can be optimized by the treatment element according to the invention and adapted to predetermined requirements. The at least one outer contour portion $A(\Delta\phi_j)$, in this case, in particular forms a part of the active flanks lying in the rotational direction.

The treatment element may be configured as a kneading element or kneading disc and have a constant outer contour in the direction of the longitudinal axis M. A plurality of kneading elements may be assembled with different offset angles about the longitudinal axis M with respect to kneading blocks. The kneading blocks may be produced in one part or be assembled from individual kneading elements.

Furthermore, the treatment element can be configured as a worm element, the outer contour of which is screwed in the direction of the longitudinal axis M by a constant and/or continuous function. The screwing can basically take place in the two rotational directions about the longitudinal axis M, so the worm element selectively has a conveying or retaining effect. Depending on the geometry of the worm element, the outer contour can optionally be understood as a cross sectional projection.

Furthermore, the treatment element may be configured as a transition element, which, in the direction of the longitudinal axis M, has a starting outer contour and an end outer contour, which are different, and change in the direction of the longitudinal axis M according to a continuous function in such a way that the starting outer contour continuously passes into the end outer contour.

The treatment element according to the invention can therefore be used with associated further treatment elements in any tightly meshing multi-shaft worm machines, in particular in two-shaft worm machines which can be rotatably driven in the same or opposite directions. The adjacent, tightly meshing treatment elements in this case form a treatment element group, the treatment elements of which were constructed by unwinding the notional rod of the length a on a common evolute $E_j$ or a plurality of common evolutes $E_j$.

The invention is furthermore based on the object of developing a multi-shaft worm machine of the generic type in such a way that a high flexibility is produced in the adjustment of the shear and/or extensional flows acting on the material to be processed.

This object is achieved by a multi-shaft worm machine having, in which
at least two treatment elements arranged directly next to one another are configured such that each treatment element comprises
a longitudinal axis M,
a respective core radius $R_i$ having the longitudinal axis M as the centre point and an outer radius $R_a$,
an outer contour $A(\phi)$ running about the longitudinal axis M, wherein
$\phi$ is the angle about the longitudinal axis M and $R_i \leq D_A(\phi) \leq R_a$ applies to a spacing $D_A(\phi)$ of the outer contour $A(\phi)$ from the longitudinal axis M,
wherein
the outer contour $A(\phi)$ has at least one outer contour portion $A(\phi)$, which runs along an angle portion $A_T$, which has a continuously changing spacing $D_A(\Delta\phi)$ from the longitudinal axis M, wherein $R_i < D_A(\Delta\phi) < R_a$, and
which has an associated evolute E,
which is a quantity of n points P(i) where i=1 to n and n≥3,
wherein each of the points P(i) lies outside the longitudinal axis M and within the outer radius $R_a$, and
wherein two respective adjacent points P(i) and P(i+1) have the spacing, and
the sum of the core radius $R_i$ and the outer radius $R_a$ substantially equals the axial spacing a.

By means of the at least two treatment elements according to the invention, the wedges between the flanks and the inner contour of the housing may be flexibly varied, whereby the shear and/or extensional flows exerted can be optimally adapted to the material to be processed. The at least two treatment elements are configured and arranged in such a way that they tightly mesh and form a corresponding treatment element group. This is achieved in that the sum of the outer radius $R_a$ and the core radius $R_i$ substantially corresponds to the axial spacing a. Substantially this means that the axial retraction b, which is conventional in practice, is disregarded. If the axial retraction b is taken into account, the sum of the outer radius $R_a$ and the core radius $R_i$ corresponds to the difference of the axial spacing a and the axial retraction b.

The at least two treatment elements of the treatment element group were constructed on at least one common evolute $E_j$ by unwinding a notional rod with the length of the axial spacing a or the axial spacing a less the axial retraction b.

Depending on the type, arrangement and evolute $E_j$, the treatment elements of the treatment element group may be symmetrical, for example axially and/or rotationally symmetrical, or non-symmetrical and/or congruent or non-congruent. Moreover, the at least two treatment elements may be developed in accordance with the configurations according to the invention.

Further features, details and advantages of the invention emerge from the following description of a plurality of embodiments with the aid of the drawings.

DESCRIPTION OF THE PREFERRED EMBODIMENTS

Figure 1:
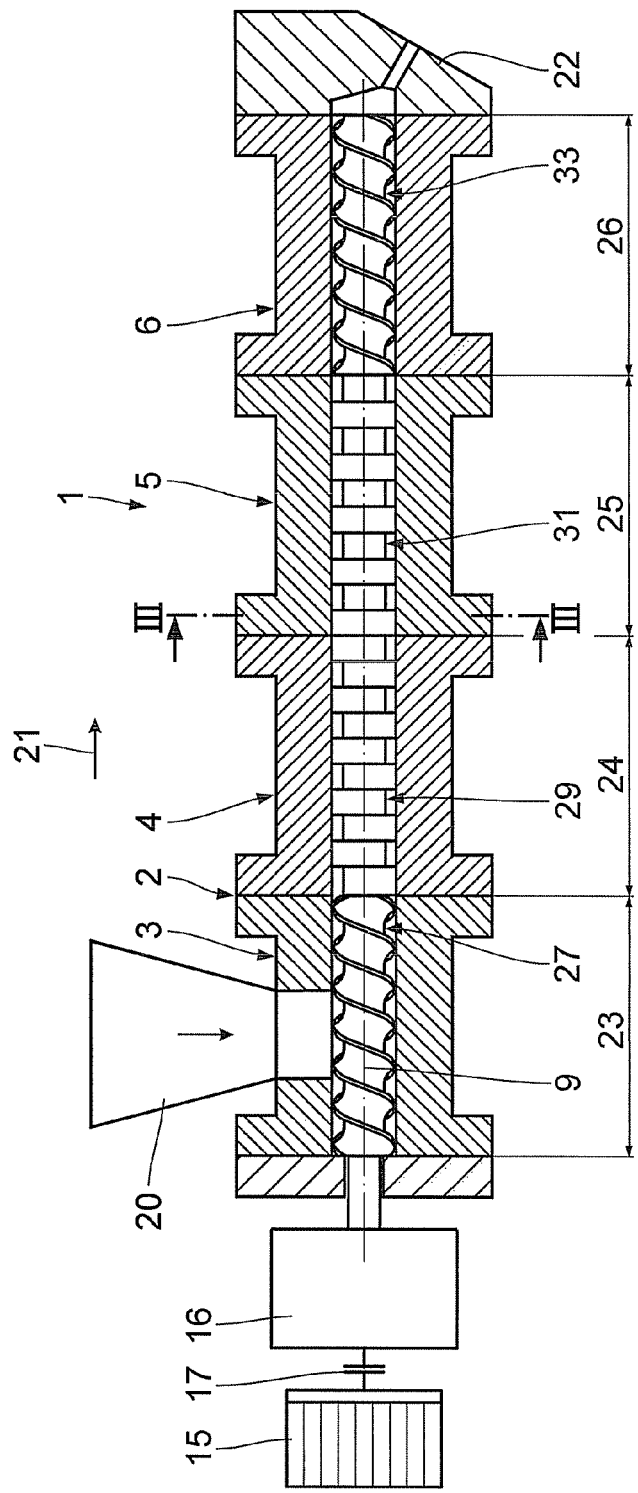
FIG. 1 shows a schematic view of a two-shaft worm machine configured as a two-shaft extruder according to first embodiment.
Figure 2:
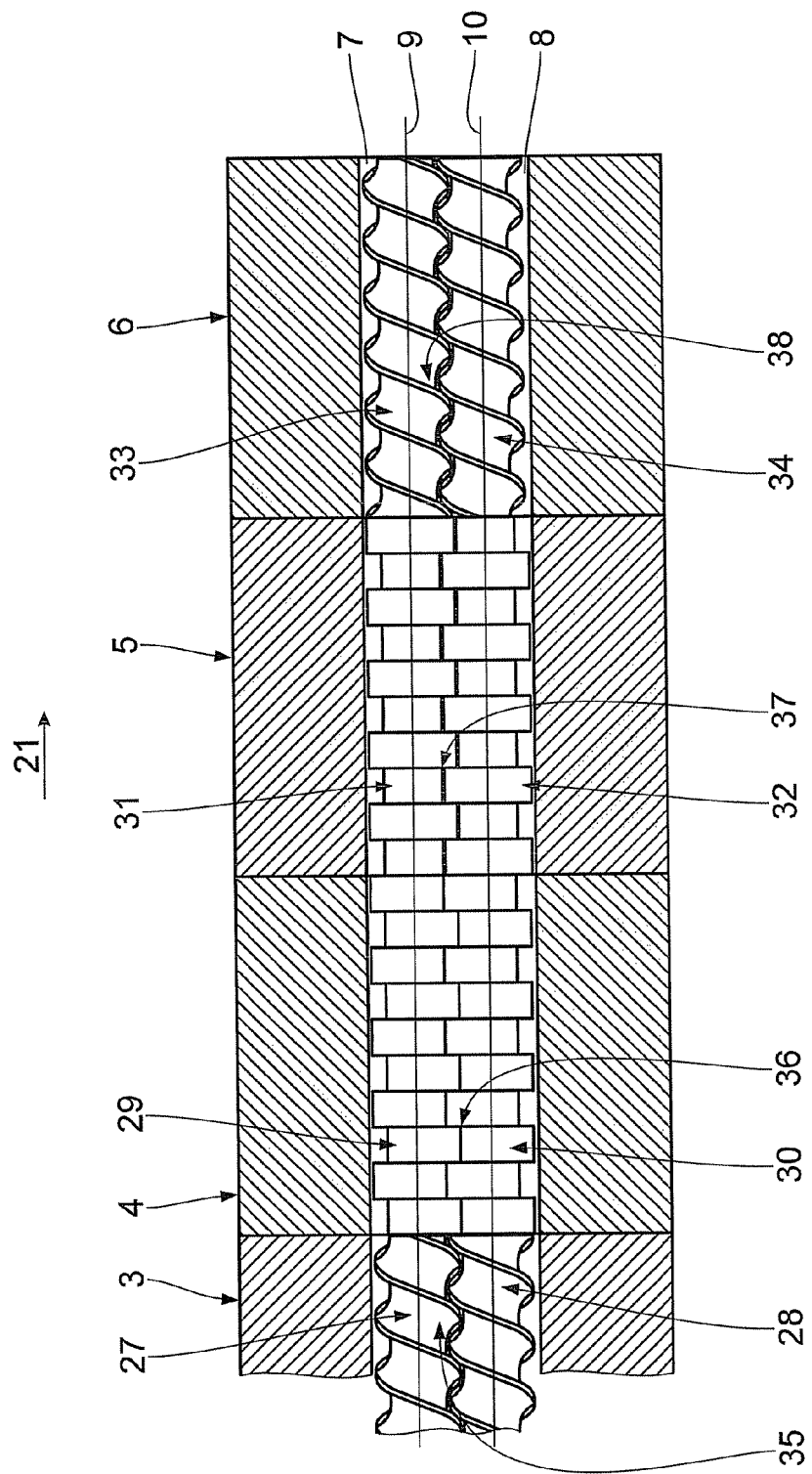
FIG. 2 shows a horizontal part longitudinal section through the two-shaft worm machine in FIG. 1.

A first embodiment of the invention will be described below with reference to FIGS. 1 to 8. A two-shaft worm machine 1 configured as a two-shaft extruder has a housing 2 consisting of a plurality of housing portions 3, 4, 5, 6 arranged one behind the other and designated housing sections. Configured in the housing 2 are a first housing bore 7 and a second housing bore 8 penetrating the latter, the associated axes 9, 10 of which run parallel to one another. In the penetration region of the housing bores 7, 8, the housing portions 3 to 6 have an upper first interstice 11 and a correspondingly configured lower second interstice 12.

Shafts 13, 14, which can be rotatably driven by a drive motor 15, are arranged in the housing bores 7, 8 concentrically with respect to the respectively associated axis 9, 10. A branch gearing 16 is arranged between the shafts 13, 14 and the drive motor 15, a clutch 17 being in turn arranged between the drive motor 15 and the branch gearing 16. The shafts 13, 14 are driven in the same direction, in other words in the same rotational directions 18, 19 about the axes 9, 10. The axes 9, 10 are accordingly also designated rotational axes.

Arranged on the first housing portion 3 adjacent to the branch gearing 16 is a material feed 20 in the form of a funnel, through which plastics material to be prepared or processed can be fed into the housing bores 7, 8. The material is conveyed in a conveying direction 21 from the first housing portion 3 to the last housing portion 6 through the housing 2 and leaves the worm machine 1, for example, through a nozzle plate 22 closing off the housing 2.

The worm machine 1, one behind the other in the conveying direction 21, has a feed zone 23, a melting zone 24, a mixing zone 25 and a pressure build-up zone 26. Arranged on the shafts 13, 14 configured as toothed shafts are—one behind the other in the conveying direction 21 respectively associated with one another pair-wise, first worm elements 27, 28, first kneading elements 29, 30, second kneading elements 31, 32 and second worm elements 33, 34, in each case as treatment elements. Both the worm elements 27, 28, 33, 34 and the kneading elements 29, 30, 31, 32 mesh with one another, in other words are configured to be tightly meshing. The worm elements 27, 28 arranged next to one another pair-wise in each case form a first treatment element group 35. Accordingly, the kneading elements 29, 30 or 31, 32 and the worm elements 33, 34, in each case pair-wise, form further treatment element groups 36, 37 and 38.

Figure 3:
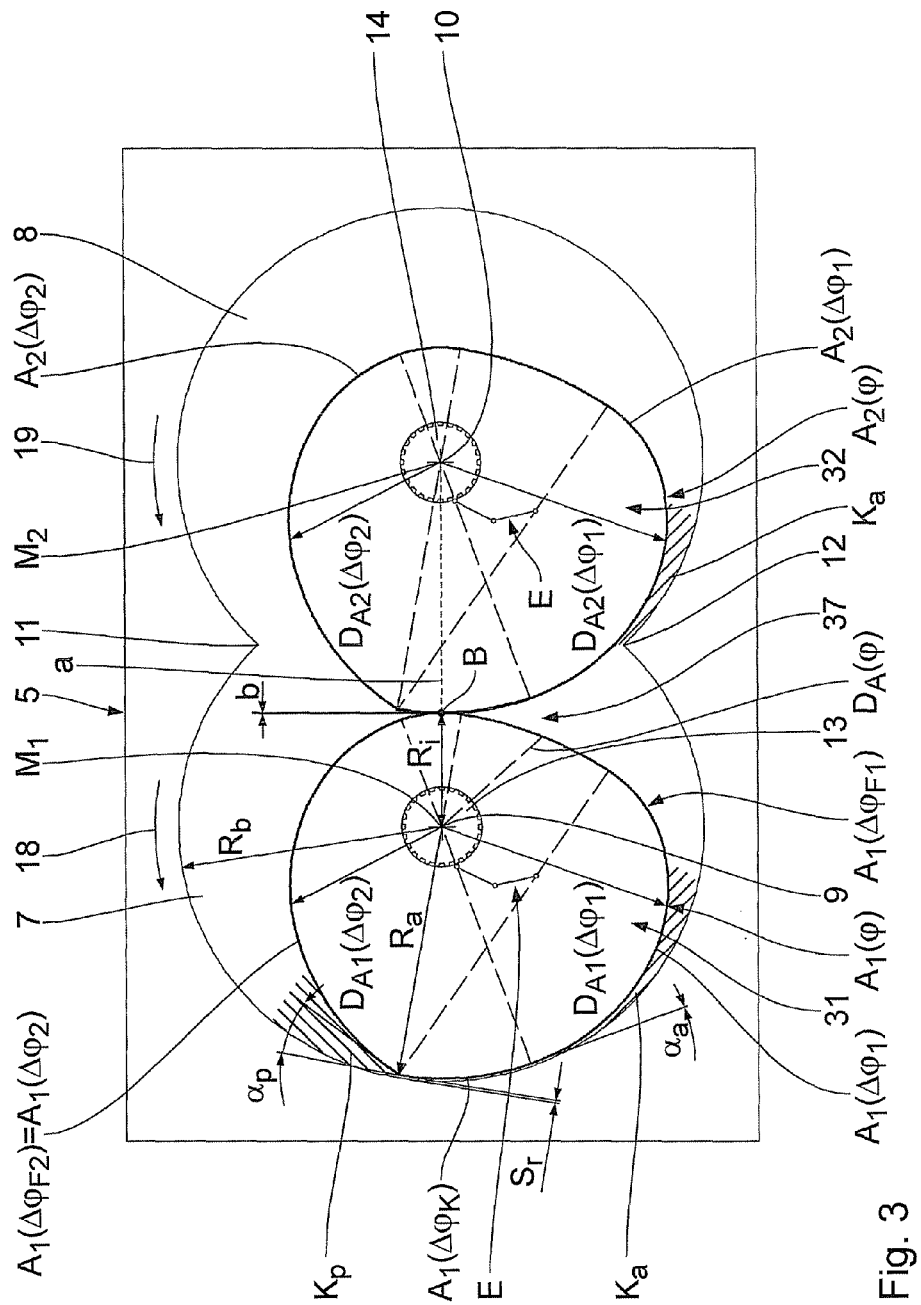
FIG. 3 shows a vertical cross section through the two-shaft worm machine according to the section line in FIG. 1 with two tightly meshing treatment elements configured as kneading elements in a first rotational position.
Figure 4:
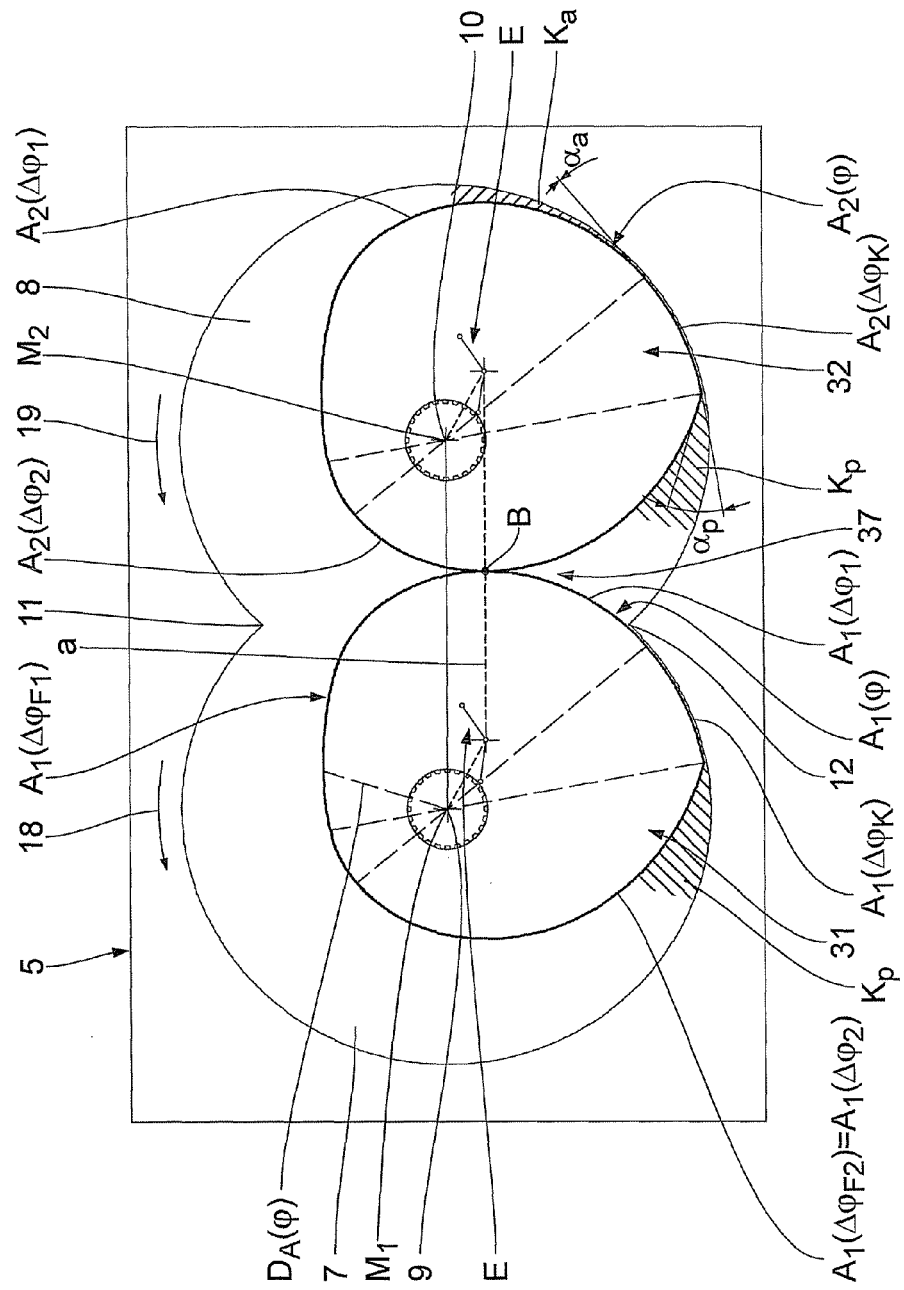
FIG. 4 shows a vertical cross section through the two-shaft worm machine in accordance with the section in FIG. 1 with two tightly meshing treatment elements configured as kneading elements in a second rotational position.
Figure 5:
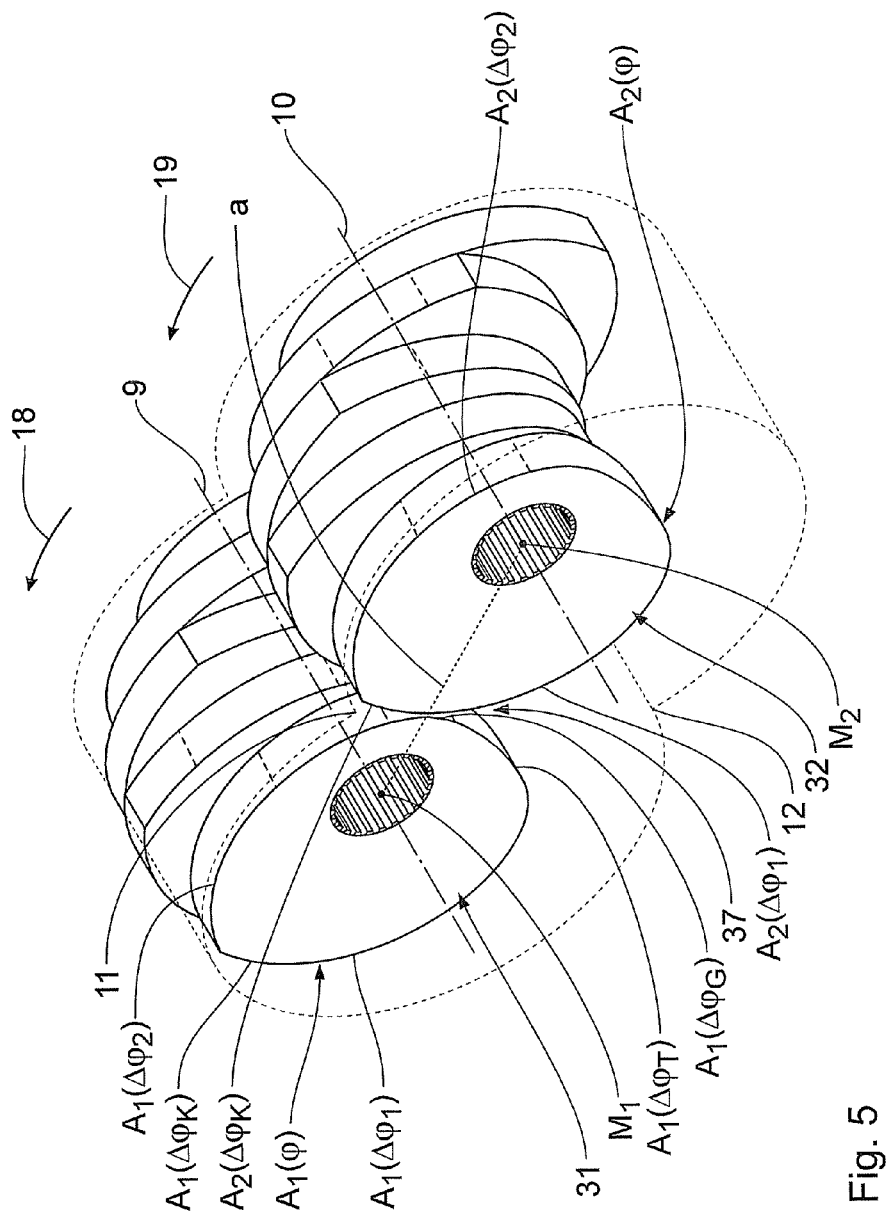
FIG. 5 shows a perspective view of a plurality of treatment elements according to FIG. 3.

A treatment element group 37 consisting of the kneading elements 31, 32 will be described in detail below with the aid of FIGS. 3 to 8. Only one treatment element group is shown in FIGS. 3 and 4 for reasons of clarity. The kneading elements 31, 32 of the following treatment element groups 37, for example, have an offset angle about the respective longitudinal axis M of 30°. The kneading elements 31, 32 are configured to be single-threaded and congruent with respect to one another. This means that the kneading elements 31, 32 can be made congruent by displacement and/or rotation about their respective longitudinal axis $M_1$ or $M_2$. The longitudinal axes $M_1$ and $M_2$ are concentric with respect to the associated rotational axes 9, 10 of the shafts 13, 14. In a cross sectional plane running perpendicular to the longitudinal axes $M_1$, $M_2$, the kneading elements 31, 32 in each case have an outer contour $A_1(\phi)$, $A_2(\phi)$ running about the associated longitudinal axis $M_1$, $M_2$, wherein $\phi$ is the angle about the respective longitudinal axis $M_1$, $M_2$ and is between $0 \le \phi \le 360°$. As the kneading elements 31, 32 are congruent with one another, their outer contours $A_1(\phi)$ and $A_2(\phi)$ are identical. Inasmuch as it is unimportant to distinguish the outer contours $A_1(\phi)$ and $A_2(\phi)$ below and the longitudinal axes $M_1$ and $M_2$, these are designated together by $A(\phi)$ or M.

The outer contours $A(\phi)$ have, relative to their respective longitudinal axis M, which serve as centre points, a minimum core radius $R_i$ and a maximum outer radius $R_a$. The outer radius $R_a$ is smaller by a radial play $<S_i>$ than the inner radius $R_b$ of the housing bores 7, 8. As the kneading elements 31, 32 are configured to be tightly meshing, the sum of the core radius $R_i$ and the outer radius $R_a$ substantially equals the axial spacing a of the rotational axes 9, 10. This substantially means that a slight axial retraction b is disregarded. If this is taken into account, the sum of the core radius $R_i$ and the outer radius $R_a$ is equal to the difference of the axial spacing a and axial retraction b. The axial retraction b is disregarded below.

Figure 8:
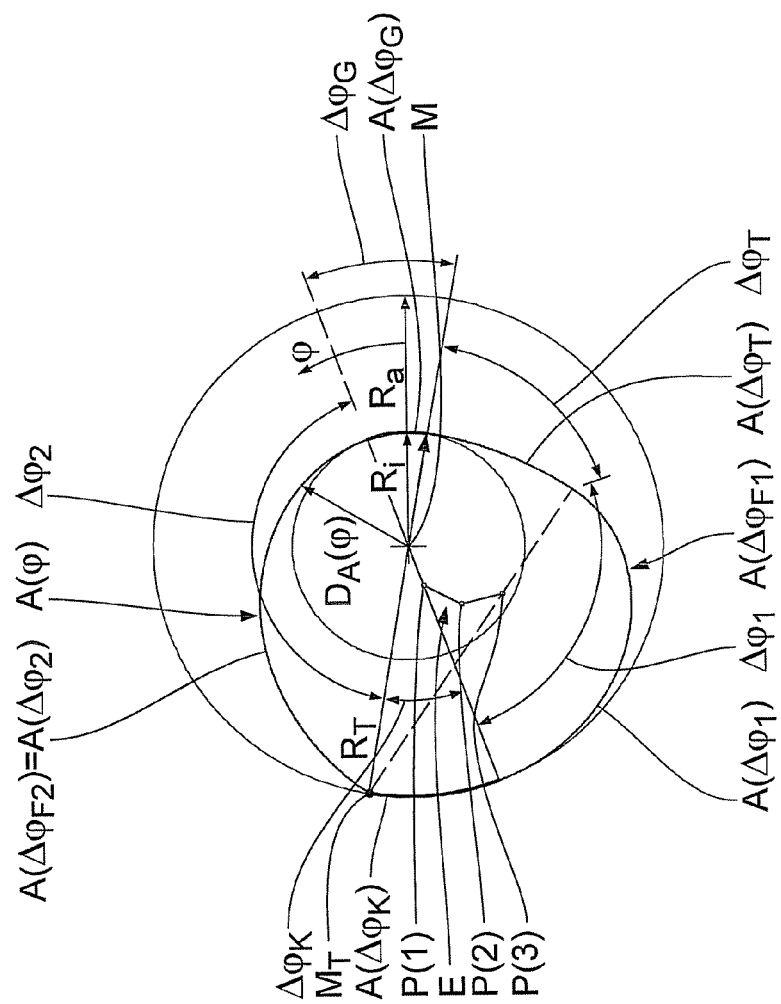
FIG. 8 shows a construction diagram to illustrate a third construction step of the treatment elements in FIG. 3.

The construction of the outer contours $A(\phi)$ and their course will be described in detail below. The outer contours $A(\phi)$ have a spacing $D_A(\phi)$ from their longitudinal axis M, in each case, for which there applies in each case: $R_i \leq D_A(\phi) \leq R_a$. The outer contours $A(\phi)$ have a crest $A(\Delta\phi_K)$, a base $A(\Delta\phi_G)$ and two flanks $A(\Delta\phi_{F1})$ and $A(\Delta\phi_{F2})$. The angle portions $\Delta\phi_K$, $\Delta\phi_G$ and $\Delta\phi_F$ are designated the crest angle, base angle and flank angle. This is illustrated in FIG. 8.

Figure 7:
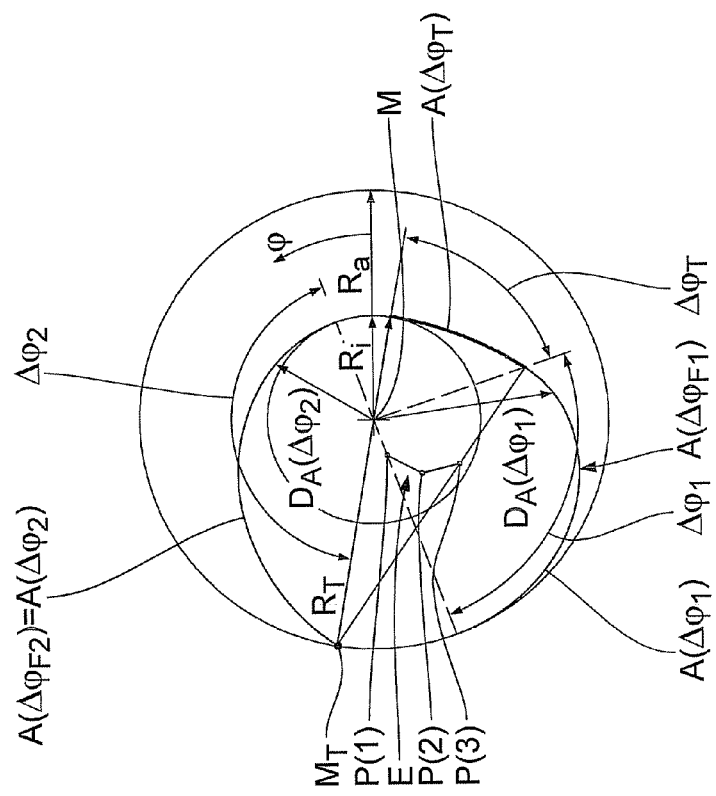
FIG. 7 shows a construction diagram to illustrate a second construction step of the treatment elements in FIG. 3.

The first flank $A(\Delta\phi_{F1})$ is composed of a first outer contour portion $A(\Delta\phi_1)$ with an angle portion $\Delta\phi_1$ and a transition portion $A(\Delta\phi_T)$ with a transition angle $\Delta\phi_T$ and forms an active flank of the kneading element 31, 32 in the respective rotational direction 18, 19. The second flank $A(\Delta\phi_{F2})$ corresponds to a second outer contour portion $A(\Delta\phi_2)$ with an angle portion $\Delta\phi_2$ and forms a passive flank of the kneading element 31, 32 lying counter to the respective rotational direction 18, 19. The outer contour portions $A(\Delta\phi_1)$ and $A(\Delta\phi_2)$ have a continuously changing distance $D_A(\Delta\phi_1)$ and $D_A(\Delta\phi_2)$ from the respective longitudinal axis M, for which in each case $R_i < D_A(\Delta\phi) > R_a$. This is illustrated in FIG. 7.

The outer contour portions $A(\Delta\phi_1)$ and $A(\Delta\phi_2)$ have an associated evolute E, which is a quantity of three points P(i), wherein i=1 to 3. The points P(i) lie outside the respective longitudinal axis M and inside the outer radius $R_a$.

Figure 6:
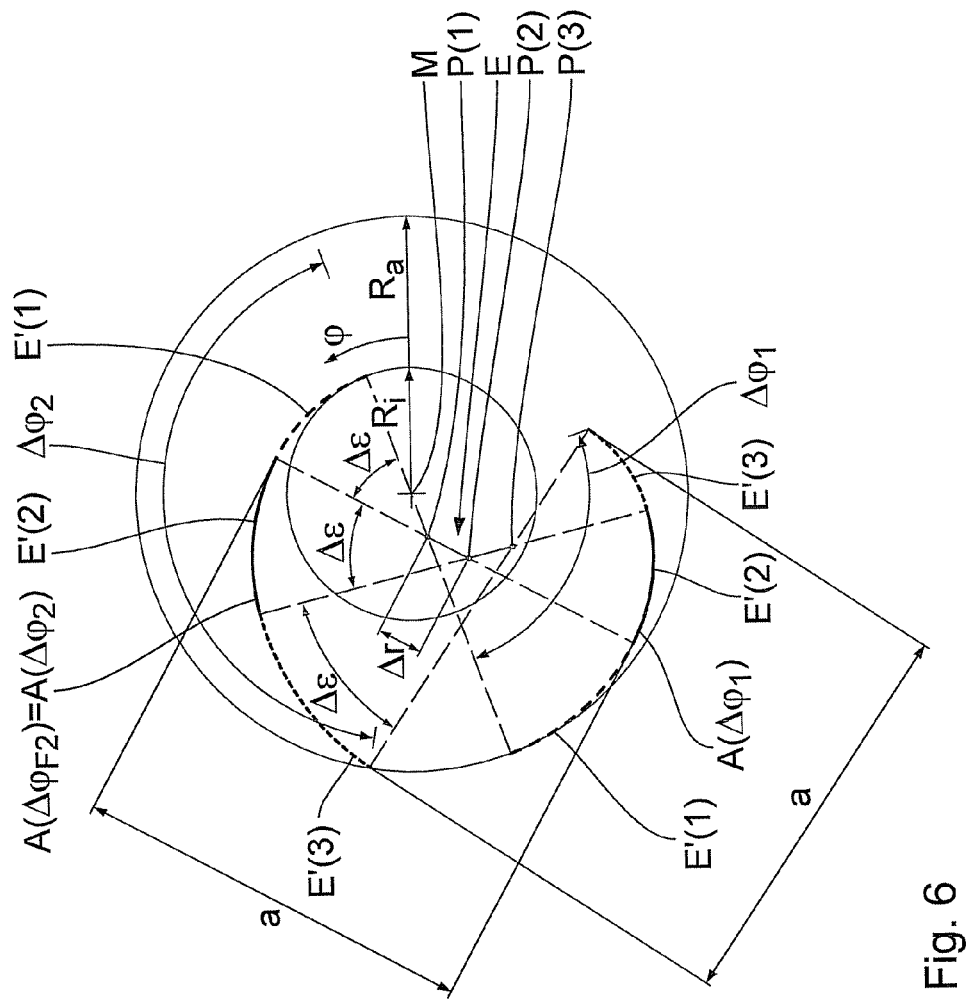
FIG. 6 shows a construction diagram to illustrate a first construction step of treatment elements in FIG. 3.

The construction of the outer contour portions $A(\Delta\phi_1)$ and $A(\Delta\phi_2)$ is illustrated in FIG. 6. To speak figuratively with respect to the construction thereof, a notional rod with the length of the axial spacing a is unwound on the evolute E, the first rod end defining the first outer contour portion $A(\Delta\phi_1)$ of one kneading element 31 and the second rod end defining the second outer contour portion $A(\Delta\phi_2)$ of the other kneading element 32 and vice versa. In other words, the notional rod is unrolled on a polygon course formed by the point P(1) to P(3), wherein the rod ends lie on the core radius $R_i$ or the outer radius $R_a$ at the beginning. The unrolling is ended when the rod end originally lying on the core radius $R_i$ impinges on the outer radius $R_a$. Unrolling is taken to mean that the notional rod is rotated about the point P(1) until the rod impinges on the next point of the polygon course, in other words on P(2). The notional rod is then rotated about the point P(2), until the rod impinges on the next point, in other words P(3). The notional rod is then rotated about the point P(3) until the rod end impinges on the outer radius $R_a$. This unrolling is illustrated in FIG. 6, the notional rod being shown in individual positions while the unwinding is shown by dashed lines.

The outer contour portions $A(\Delta\phi_1)$ and $A(\Delta\phi_2)$ are therefore formed by three circular arcs, the associated centre points of which are the points P(1) to P(3). Adjacent points of the points P(1) to P(3) have a constant spacing $\Delta r(i) = \Delta r$ from one another. This means that the radii of adjacent circular arcs, which are also called involute curves E'(1) to E'(3), differ by the spacing $\Delta r(i) = \Delta r$. The spacing $\Delta r$ is less than $R_i$ and less than $R_i/2$. In particular, the spacing $\Delta r$ may also be smaller than $R_i/4$, in particular smaller than $R_i/6$, and, in particular, smaller than $R_i/8$. The circular arcs belonging to the points P(1) to P(3) have constant angles at centre $\Delta\epsilon(i) = \Delta\epsilon$. The angles at centre $\Delta\epsilon(i) = \Delta\epsilon$ are less than 60°. In particular, the angle at centre $\Delta\epsilon$ can also be smaller than 45° and in particular smaller than 30°.

Because of the constant spacings $\Delta r$ and the constant angles at centre $\Delta\epsilon$, the points P(1) to P(3) lie on a continuous and differentiable curve in the form of a circle, which has a direction of curvature remaining the same.

FIG. 7 illustrates the further construction of the first flank portion $A(\Delta\phi F_1)$. The first flank portion $A(\Delta\phi_{F1})$ is composed of the first outer contour portion $A(\Delta\phi_1)$ and the transition portion $A(\Delta\phi_T)$ with the transition angle $\Delta\phi_T$. The transition portion $A(\Delta\phi_T)$ is a circular arc about the centre point $M_T$ with the transition radius $R_T$. The centre point $M_T$ is produced from the contact point of the outer radius $R_a$ and the second outer contour portion $A(\Delta\phi_2)$. The transition radius $R_T$ corresponds to the axial spacing a. To speak figuratively, the notional rod with the length of the axial spacing a—once the rod end impinges on the outer radius $R_a$—is pivoted about this contact point, in other words about the centre point $M_T$, until the rod crosses the longitudinal axis M. The movable rod end then comes to rest on the core radius $R_i$.

FIG. 8 illustrates the construction of the crest $A(\Delta\phi_K)$ and the base $A(\Delta\phi_G)$. The crest $A(\Delta\phi_K)$ is a circular arc with the longitudinal axis M as the centre point and a radius corresponding to the outer radius $R_a$. The base $A(\Delta\phi_G)$ is also a circular arc with the longitudinal axis M as the centre point and a radius corresponding to the core radius $R_i$. To speak figuratively, the notional rod, once this has impinged on the longitudinal axis M, is rotated about the latter, until the rod ends again impinge on their starting points. The crest angle $\Delta\phi_K$ therefore corresponds to the base angle $\Delta\phi_G$.

As the rod ends in each case define one of the outer contours $A_1(\phi)$ or $A_2(\phi)$, the process described has to be repeated again in order to define the complete outer contour $A_1(\phi)$ or $A_2(\phi)$ for each of the kneading elements 31, 32. Because of the fact that the outer contour portions $A(\Delta\phi_1)$ and $A(\Delta\phi_2)$ are formed on a common evolute E or have a common evolute E, the outer contours $A_1(\phi)$ and $A_2(\phi)$ resulting from the construction process are congruent. This means that the construction process described above does not have to be repeated for this special case, as both kneading elements 31, 32 are already constructed thereby.

The outer contour portions $A(\Delta\phi_1)$ and $A(\Delta\phi_2)$ are curved over their respective angle portions $\Delta\phi_1$ and $\Delta\phi_2$ and have no straight part portions. Moreover, the outer contours $A_1(\phi)$ or $A_2(\phi)$ have a uniform direction of curvature.

As can be seen from FIGS. 3 and 4, the evolutes E which are the same and associated with the kneading elements 31, 32 can be moved into one another by a linear displacement by the axial spacing a in the direction thereof. The sum of the spacings of the evolutes E or the curves, on which the points P(i) of the evolutes E lie, from the contact point B in the direction of the axial spacing a in each rotational position is substantially equal to the axial spacing a, whereby the kneading elements 31, 32 are tightly meshing.

The wedge $K_a$ between the inner contour of the housing bores 7, 8 and the active flank $A(\Delta\phi_{F1})$ and the corresponding wedge $K_p$ between the inner contour of the passive flank $A(\Delta\phi_{F2})$ can be flexibly adjusted in the kneading elements 31, 32 according to the invention, whereby the shear and/or extensional flows can be optimally adapted to the plastic material to be processed. The active angle $\alpha_a$ of intersection of the crest $A(\Delta\phi_K)$ and the active flank $A(\Delta\phi_1)$ is 0°. The passive angle $\alpha_p$ of intersection of the crest $A(\Delta\phi K)$ and the passive flank $A(\Delta\phi_{F2})$ is greater than 0°.

Since the spacing of the evolutes E of the kneading elements 31, 32 in every rotational position corresponds to the axial spacing a, the kneading elements 31, 32 are tightly meshing and have a common tangent in their respective contact point B.

Figure 9:
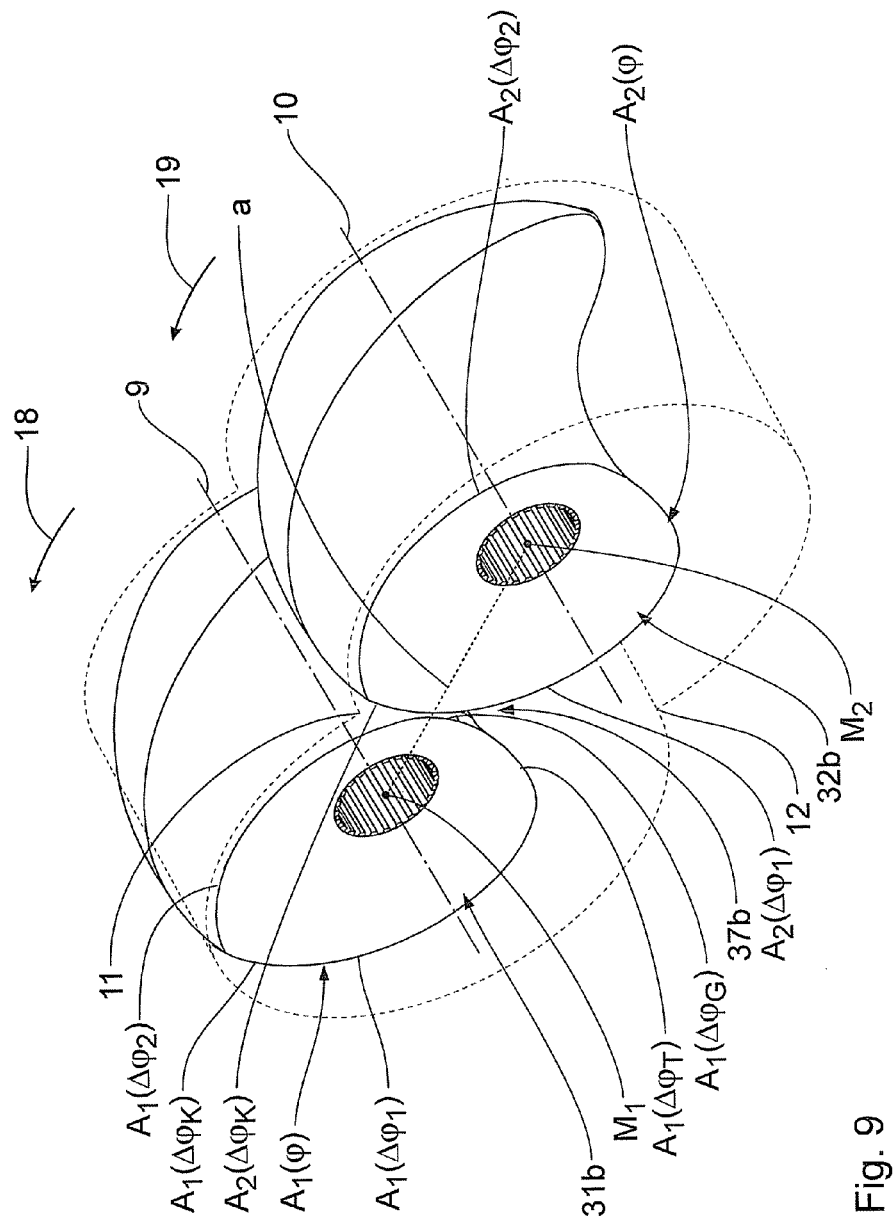
FIG. 9 shows a perspective view of a plurality of tightly meshing treatment elements configured as worm elements according to a second embodiment.

A second embodiment of the invention will be described below with reference to FIG. 9. In contrast to the previous embodiment, the treatment elements 31a, 32a are configured as worm elements. The outer contours $A_1(\phi)$ and $A_2(\phi)$ correspond to the first embodiment, wherein the latter are screwed along the respective rotational axis 9, 10 with a constant and continuous function. With regard to the further mode of functioning, reference is made to the first embodiment.

Figure 10:
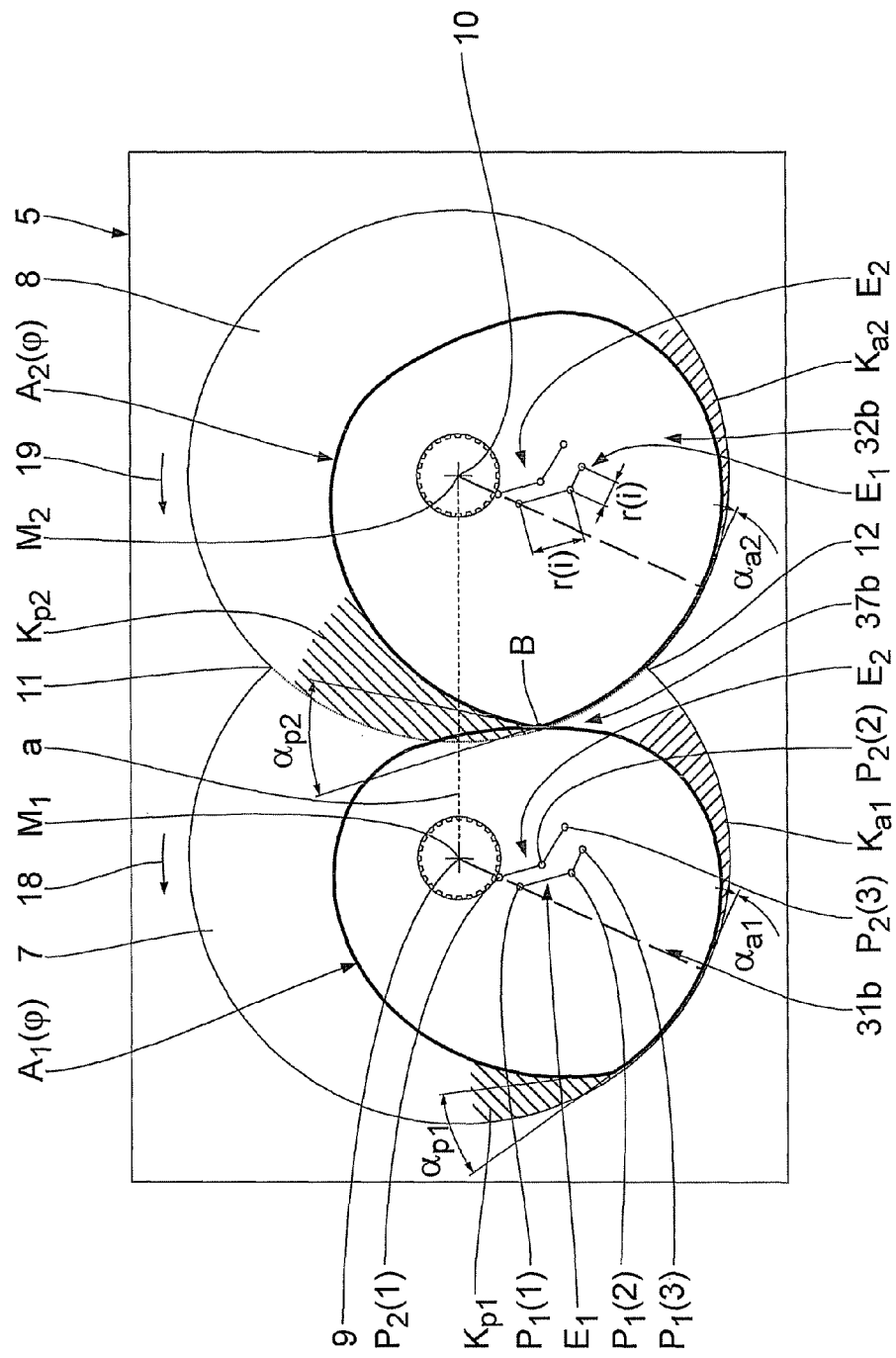
FIG. 10 shows a vertical cross section according to FIG. 3 with treatment elements according to a third embodiment.
Figure 11:
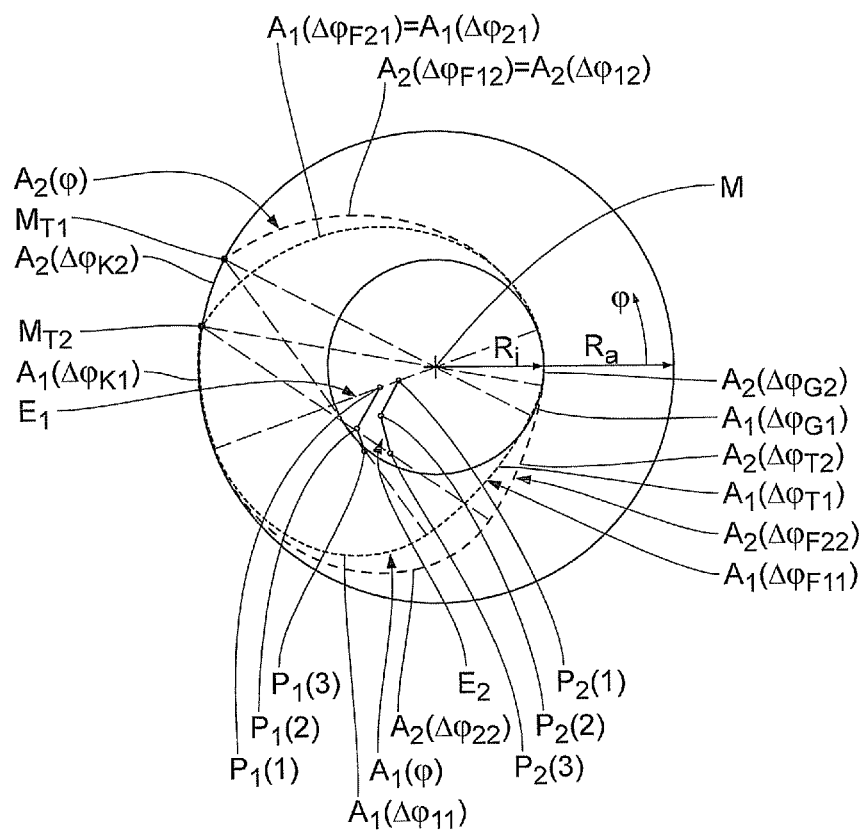
FIG. 11 shows a construction diagram for illustrating the construction steps of the treatment elements in FIG. 10.
Figure 12:
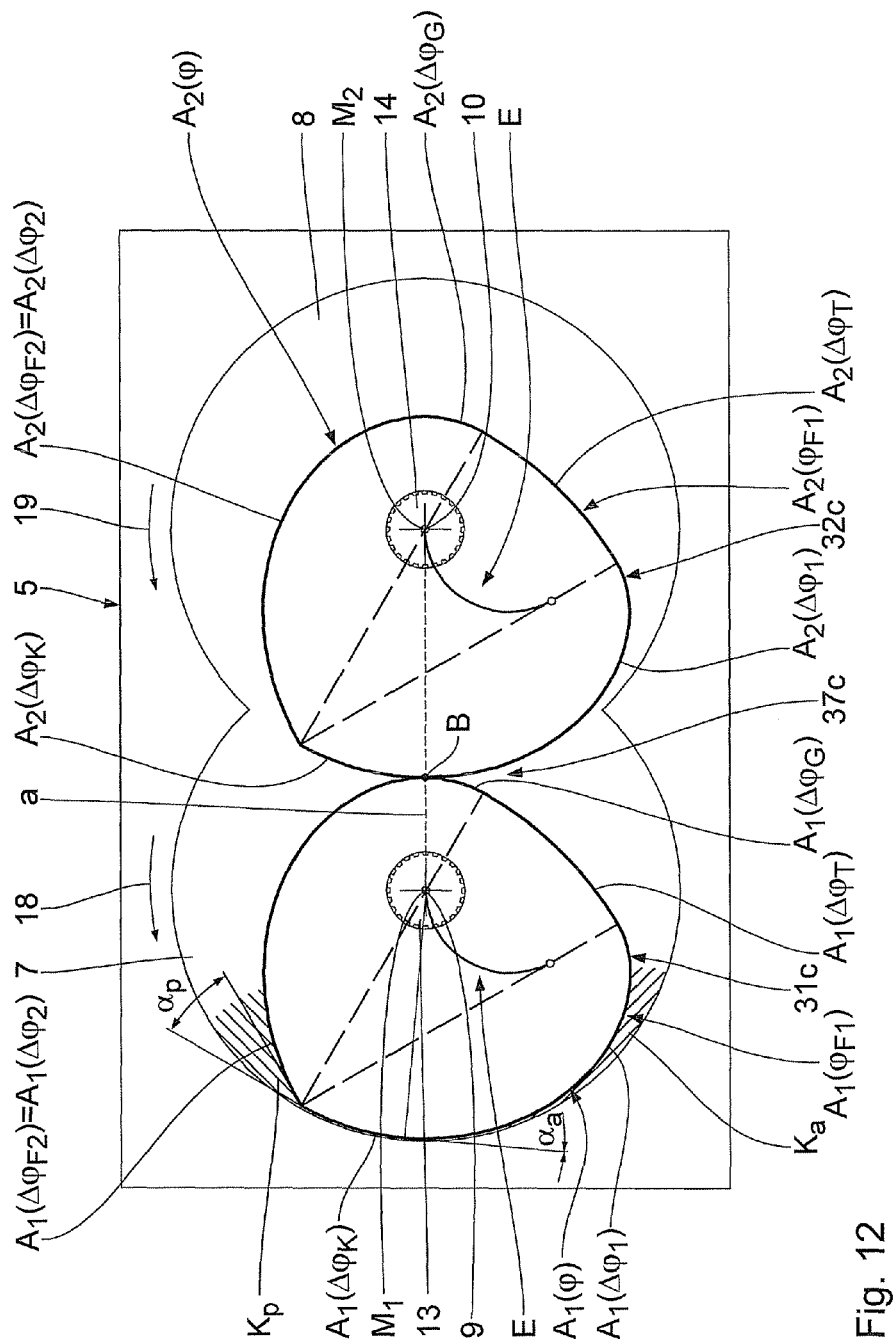
FIG. 12 shows a vertical cross section according to FIG. 3 with treatment elements according to a fourth embodiment.
Figure 13:
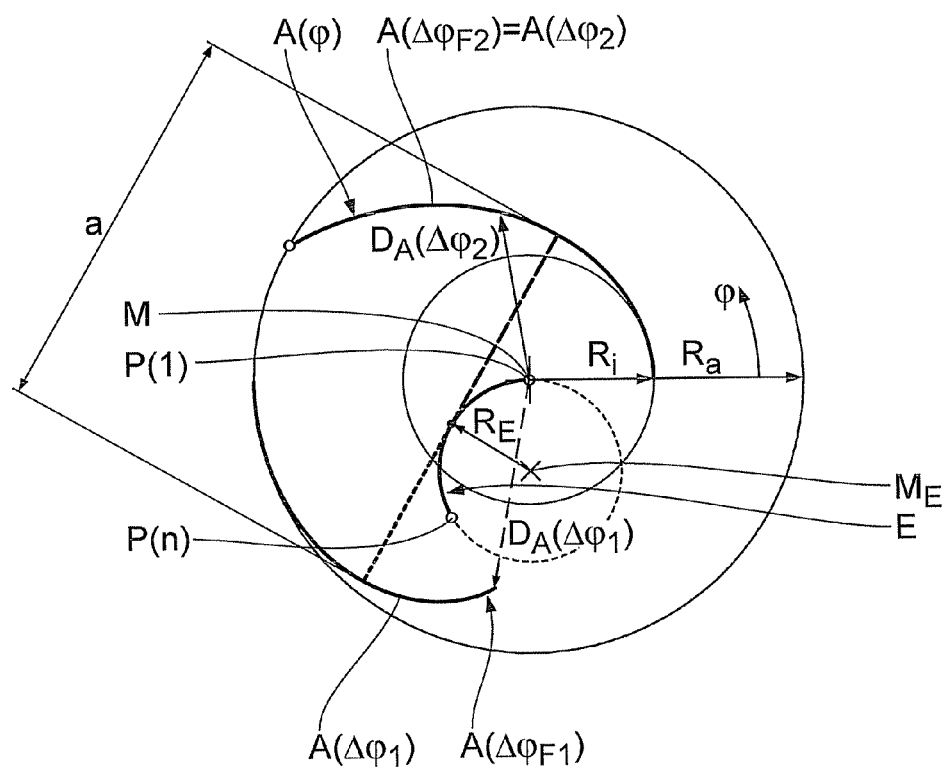
FIG. 13 shows a construction diagram for illustrating a first construction step of the treatment elements in FIG. 12.
Figure 14:
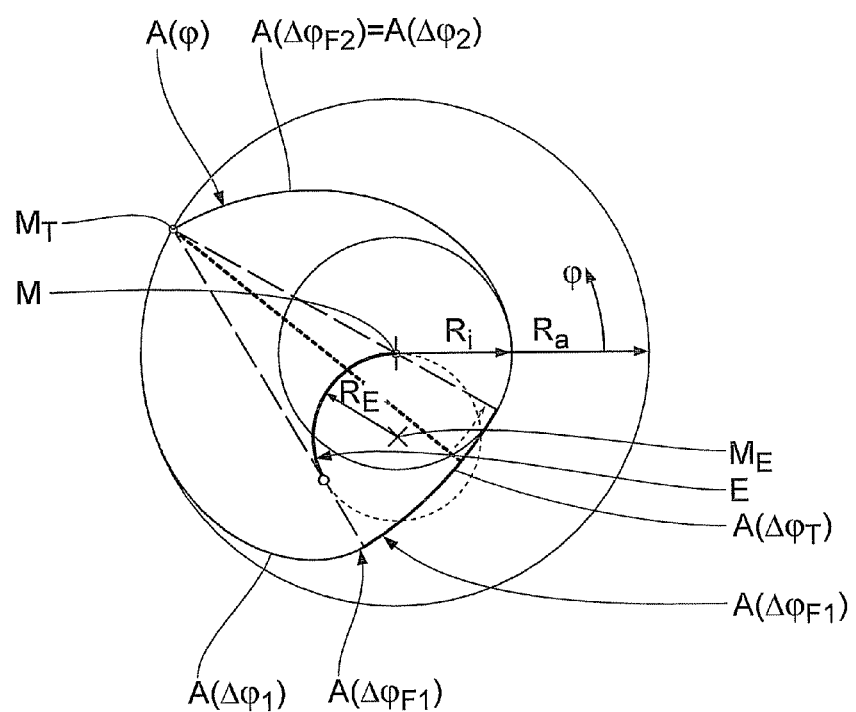
FIG. 14 shows a construction diagram to illustrate a second construction step of the treatment elements in FIG. 12.
Figure 15:
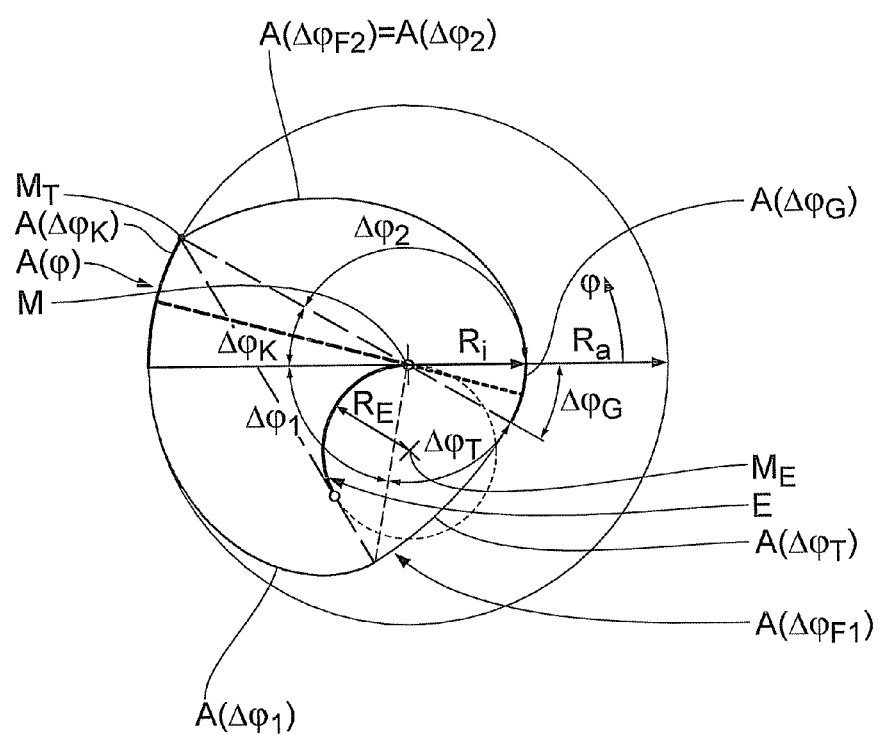
FIG. 15 shows a construction diagram to illustrate a third construction step of the treatment elements in FIG. 12.

A third embodiment of the invention will be described below with reference to FIGS. 10 and 11. The kneading elements 31b and 32b are neither congruent with respect to one another nor symmetrical. The kneading elements 31b, 32b in each case have two evolutes $E_j$, wherein j=1 and 2. Each of the evolutes $E_j$ is a quantity of 3 points $P_j(i)$ wherein I=1 to 3. The first evolute $E_1$ is a polygon course formed from the points $P_1(1)$ to $P_1(3)$, adjacent points of the points $P_1(1)$ to $P_1(3)$ having different spacings $\Delta r(i)$. The second evolute $E_2$ corresponds to that of the first embodiment. The outer contour portions $A_1(\Delta\phi_{11})$ and $A_2(\Delta\phi_{12})$ are formed by unwinding the notional rod at the first evolute $E_1$. In accordance with the first embodiment, the transition portion $A_1(\Delta\phi_{T1})$ is then formed by pivoting the notional rod about the centre point $M_{T1}$. By rotating the notional rod about the centre point M, the crest $A_2(\Delta\phi_{K2})$ and the base $A_1(\Delta\phi_{G1})$ are then formed in accordance with the first embodiment.

A further half rotation of the notional rod now follows. The notional rod is firstly unwound on the second evolute $E_2$, so the outer contour portions $A_1(\Delta\phi_{21})$ and $A_2(\Delta\phi_{22})$ are formed. By pivoting the notional rod about the centre point $M_{T2}$, the transition portion $A_2(\Delta\phi_{T2})$ is then formed analogously to the first embodiment. By rotating the notional rod about the centre point M, the base $A_2(\Delta\phi_{G2})$ and the crest $A_1(\Delta\phi_{K1})$ are formed and the outer contours $A_1(\phi)$ and $A_2(\phi)$ are closed. The outer contour portions $A_1(\Delta\phi_{11})$ and $A_2(\Delta\phi_{12})$ are therefore produced on the evolute $E_1$, whereas the outer contour portions $A_1(\Delta\phi_{21})$ and $A_2(\Delta\phi_{22})$ are produced on the evolute $E_2$ that is different therefrom. Accordingly, the wedges $K_{a1}$ and $K_{a2}$ or the wedges $K_{p1}$ and $K_{p2}$ and the angles $\alpha_{a1}$ and $\alpha_{a2}$ of intersection or the angles $\alpha_{p1}$ and $\alpha_{p2}$ of intersection are also configured differently. With regard to the further mode of functioning and construction, reference is made to the previous examples.

A fourth embodiment of the invention will be described below with reference to FIGS. 12 to 15. In contrast to the previous examples, the evolute E is a continuous and differentiable curve in the form of a circular arc about the centre point $M_E$. Viewed mathematically, this evolute E can be formed in that a limit transition toward zero is carried out for the angle at centre $\Delta\epsilon$ in accordance with the first embodiment. The spacing $\Delta r$ of the points P(i) then passes into the arc length ds and the angle at centre $\Delta\epsilon$ passes into the change of the tangent direction $d\epsilon$. The evolute E therefore has the radius of curvature $R_E = ds/d\epsilon$. The evolute E is therefore a circular arc with an infinite number of points P(i), wherein i=1 to $\infty$ in the limit transition. The construction of the flanks $A(\Delta\phi_{F1})$ and $A(\Delta\phi_{F2})$ according to FIGS. 13 and 14 takes place in accordance with the first embodiment, wherein the evolute E—as already stated—is a circular arc. As the outer contour portions $A(\Delta\phi_1)$ and $A(\Delta\phi_2)$ have the same evolute E, the kneading elements 31c and 32c are congruent with respect to one another. The kneading elements 31c and 32c are, however, non-symmetrical. The active angle of intersection $\alpha_a=0°$. Accordingly, the passive angle of intersection $\alpha_p>0°$. The wedges $K_a$ and $K_p$ can thus be flexibly adapted to the plastics material to be processed. With regard to the further mode of functioning and construction, reference is made to the previous embodiments.

Figure 16:
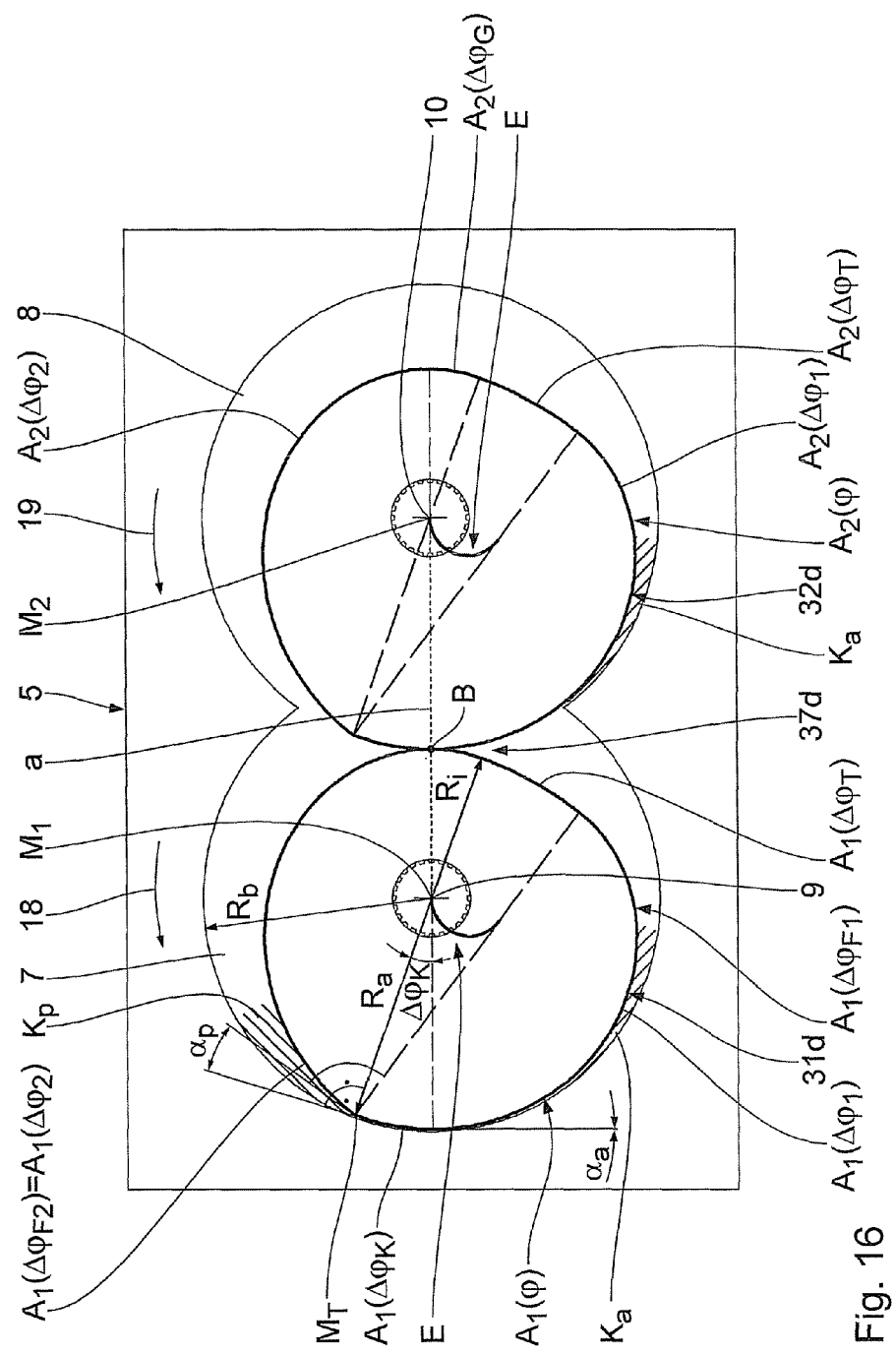
FIG. 16 shows a vertical cross section according to FIG. 3 with treatment elements according to a fifth embodiment.

A fifth embodiment of the invention will be described below with reference to FIG. 16. The kneading elements 31d and 32d are configured in accordance with the fourth embodiment and have an evolute E, which is a continuous and differentiable curve in the form of a circular arc. The ratio of the outer radius $R_a$ to the core radius $R_i$ equals 1.55. The crest angle $\Delta\phi_K=20°$ and the active angle of intersection $\alpha_a=0°$. The passive angle of intersection $\alpha_p>0°$. The associated wedges $K_a$ and $K_p$ can thus be flexibly adapted to the plastics material to be processed. Reference is made to the preceding examples with regard to the further mode of functioning and construction.

Figure 17:
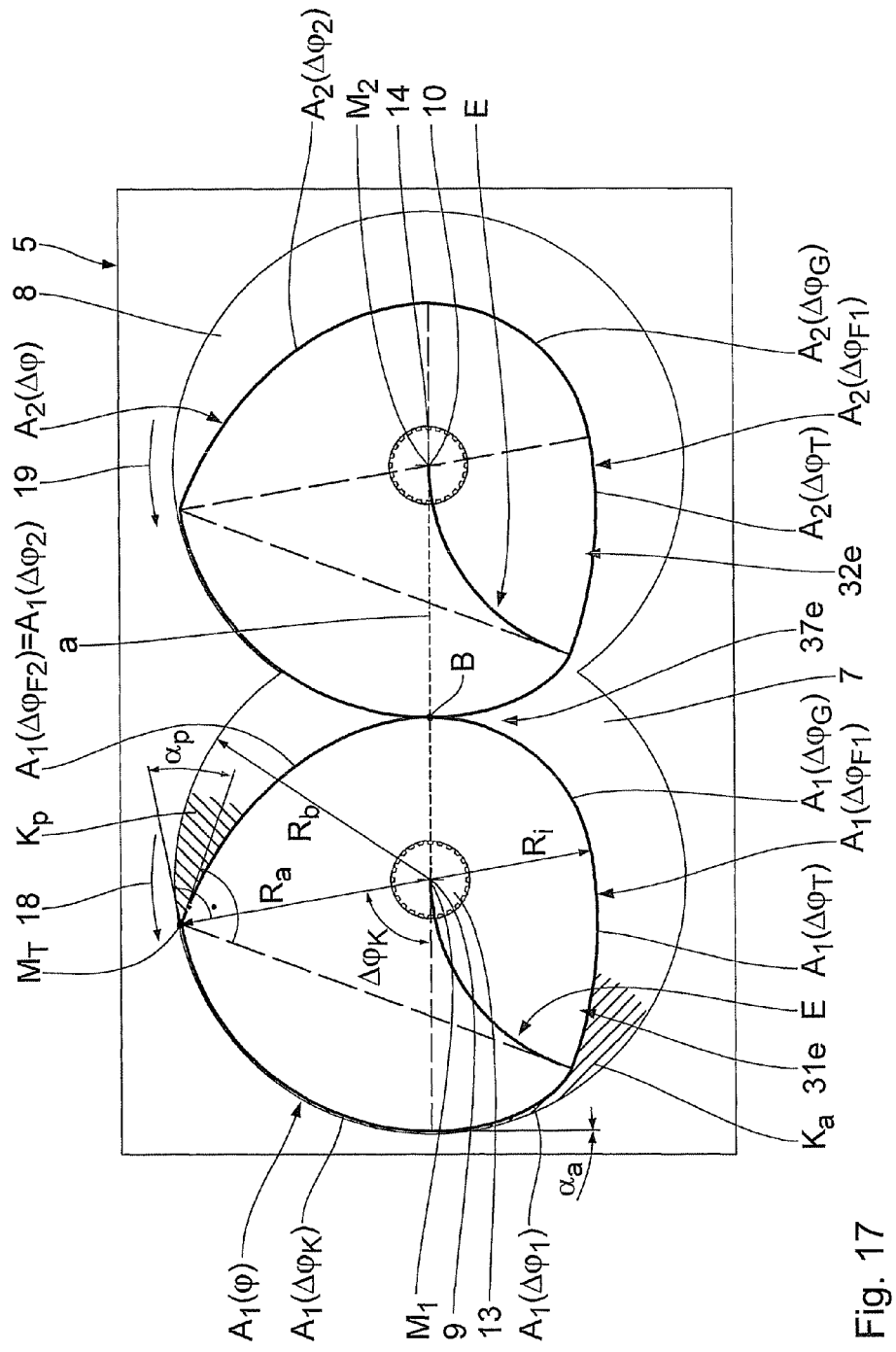
FIG. 17 shows a vertical cross section in accordance with FIG. 3 with treatment elements according to a sixth embodiment.

A sixth embodiment of the invention will be described below with reference to FIG. 17. The kneading elements 31e and 32e are configured in accordance with the fourth embodiment and have an evolute E, which is a continuous and differentiable curve in the form of a circular arc. The ratio of the outer radius $R_a$ to the core radius $R_i$ equals 1.55. The crest angle $\Delta\phi_K=80°$. The active angle of intersection $\alpha_a=0°$. The passive angle of intersection $\alpha_p>0°$. The associated wedges $K_a$ and $K_p$ can thus be flexibly adapted to the plastics material to be processed. With regard to the further mode of functioning and construction, reference is made to the previous embodiments.

Figure 18:
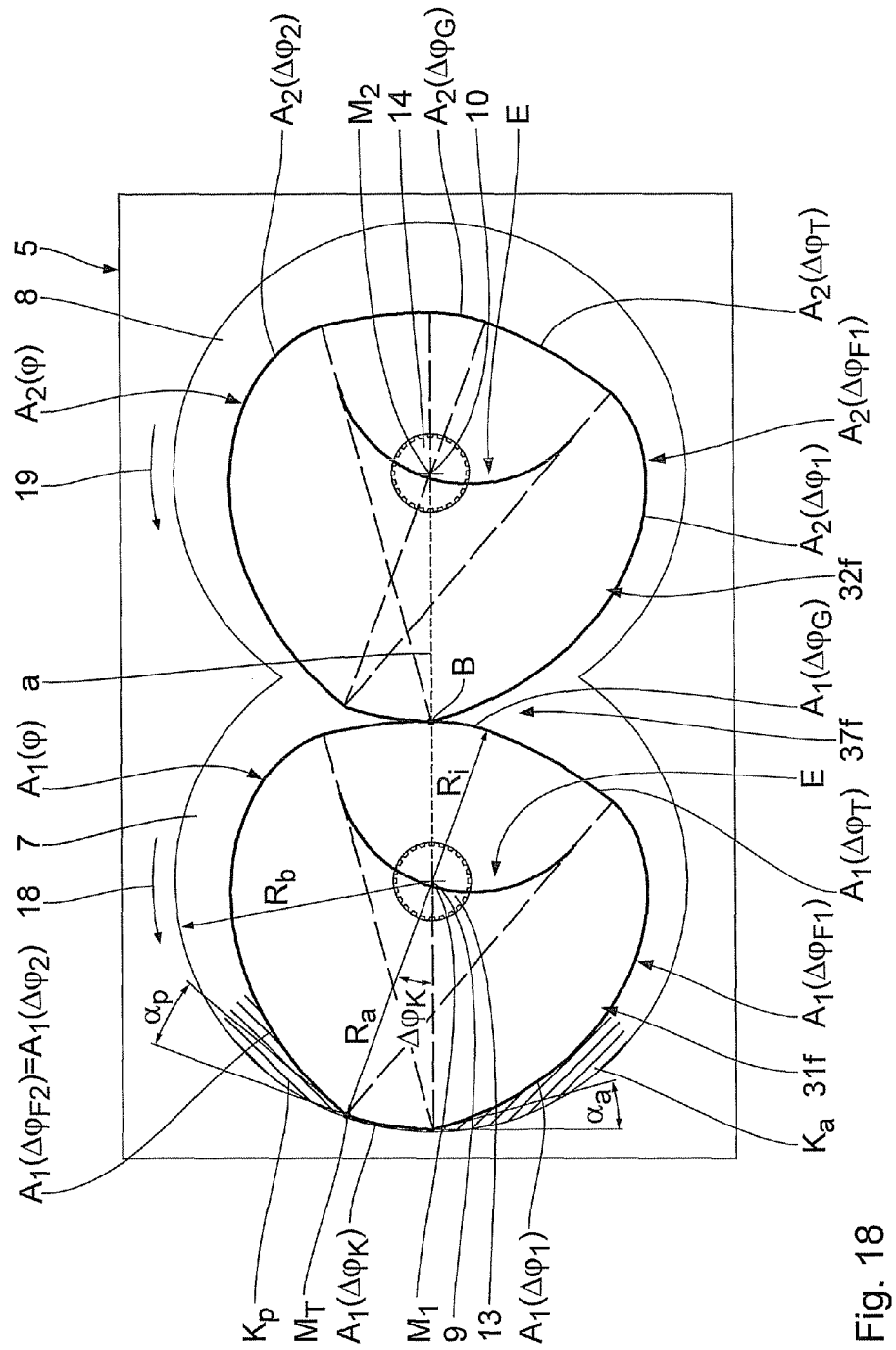
FIG. 18 shows a vertical cross section according to FIG. 3 with treatment elements according to a seventh embodiment.

A seventh embodiment of the invention will be described below with reference to FIG. 18. The kneading elements 31f and 32f are configured in accordance with the fourth embodiment and have an evolute E, which is a continuous and differentiable curve in the form of a circular arc. The ratio of the outer radius $R_a$ to the core radius $R_i$ equals 1.55. The crest angle $\Delta\phi_K=20°$. The active angle of intersection associated with the active flank $A(\Delta\phi_{F1})$ is $\alpha_a=15°$. The passive angle of intersection associated with the passive flank $A(\Delta\phi_{F2})$ is $\alpha_p=20°$. The associated wedges $K_a$ and $K_p$ can thus be flexibly adapted to the plastics material to be processed. With regard to the further mode of functioning and construction, reference is made to the previous embodiments.

Figure 19:
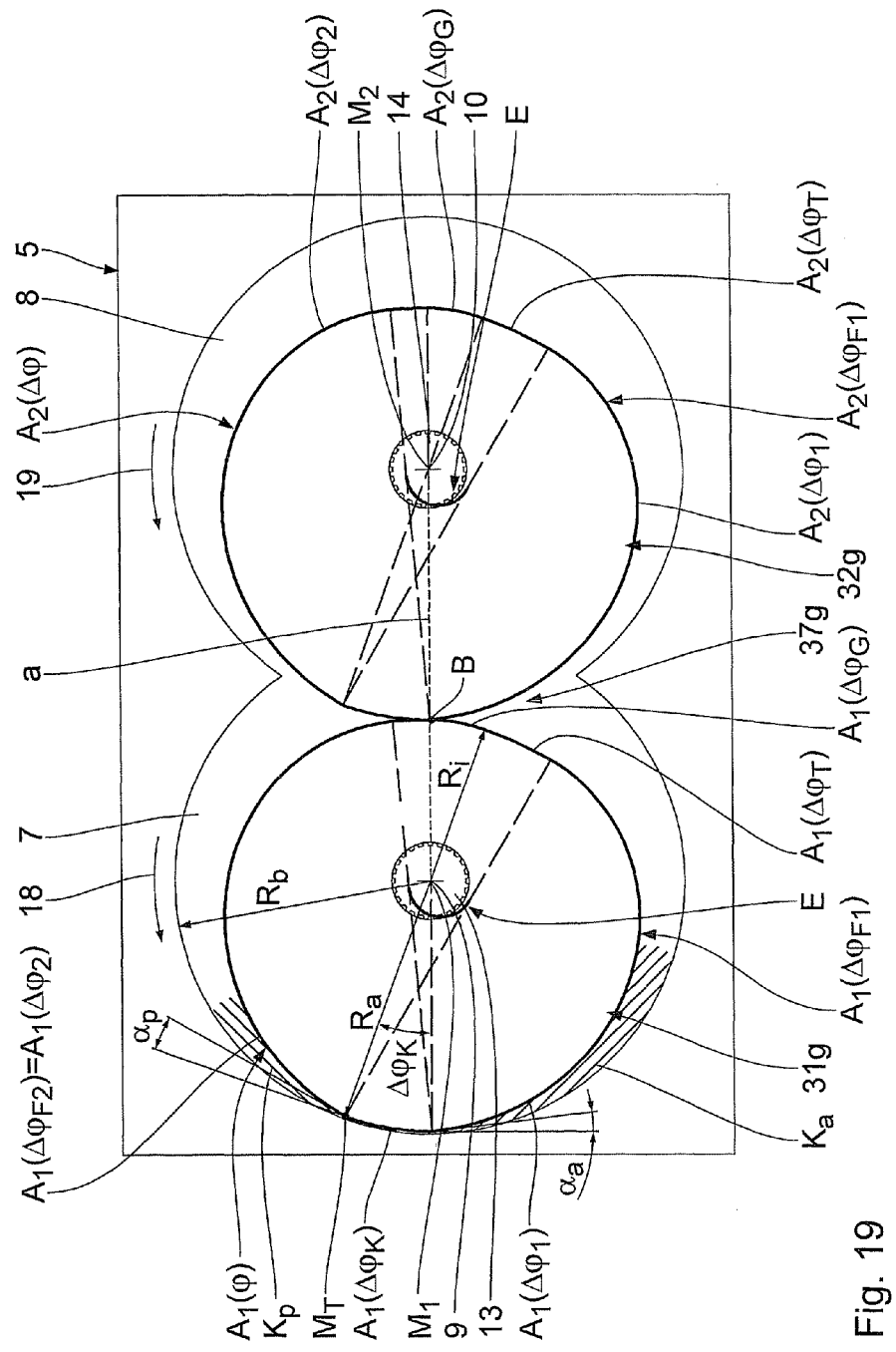
FIG. 19 shows a vertical cross section according to FIG. 3 with treatment elements according to an eighth embodiment.

An eighth embodiment of the invention will be described below with reference to FIG. 19. The kneading elements 31g and 32g are configured in accordance with the fourth embodiment and have an evolute E, which is a continuous and differentiable curve in the form of a circular arc. The ratio of the outer radius $R_a$ to the core radius $R_i$ equals 1.55. The crest angle $\Delta\phi_K=20°$. The active angle of intersection associated with the active flank $A(\Delta\phi_{F1})$ is $\alpha_a=5°$. The passive angle of intersection associated with the passive flank $A(\Delta\phi_{F2})$ is $\alpha_p=10°$. The associated wedges $K_a$ and $K_p$ can thus be flexibly adapted to the plastics material to be processed. With regard to the further mode of functioning and construction, reference is made to the previous embodiments.

Figure 20:
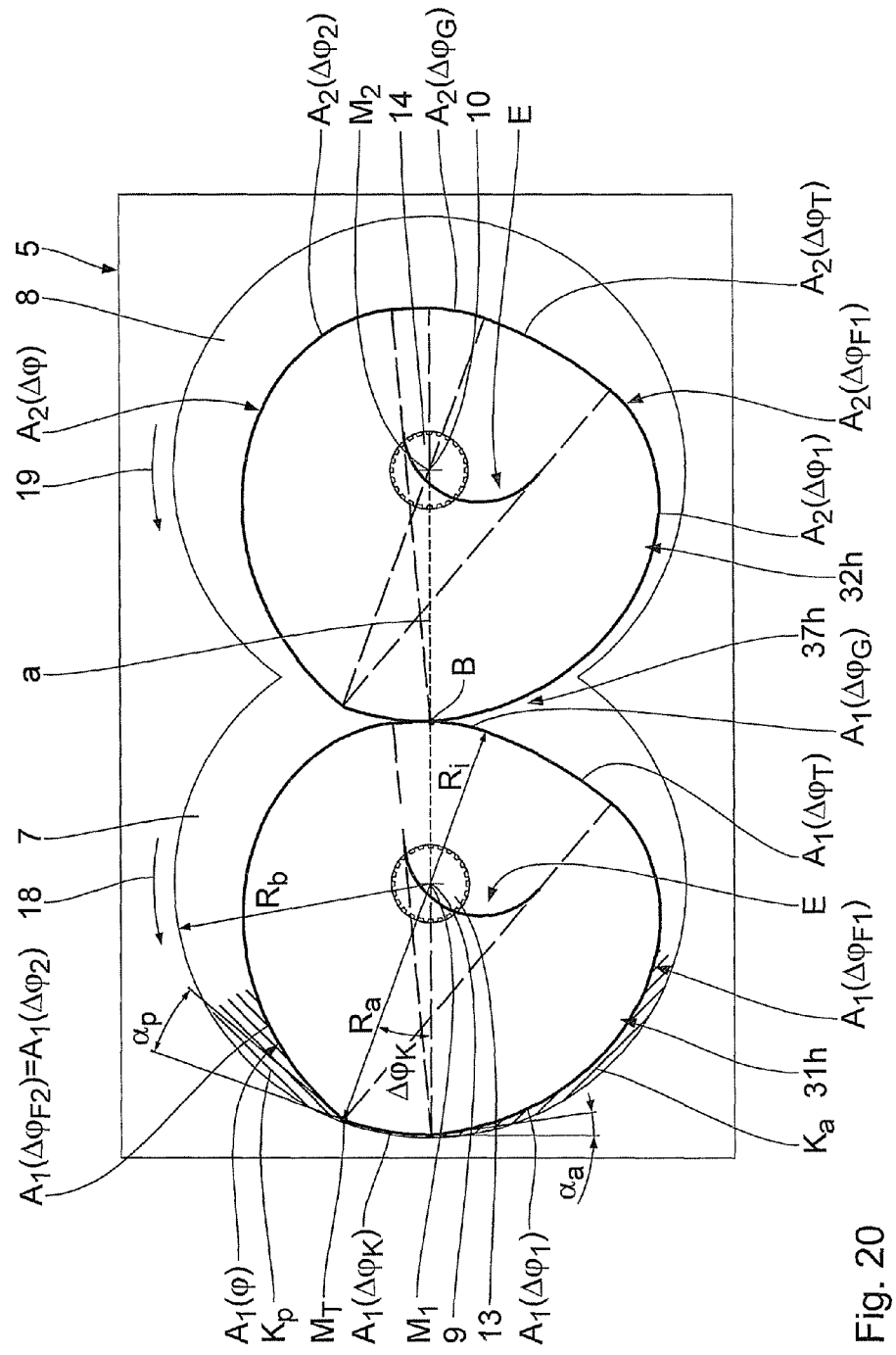
FIG. 20 shows a vertical cross section according to FIG. 3 with treatment elements according to a ninth embodiment.

A ninth embodiment of the invention will be described below with reference to FIG. 20. The kneading elements 31h and 32h are configured in accordance with the fourth embodiment and have an evolute E, which is a continuous and differentiable curve in the form of a circular arc. The ratio of the outer radius $R_a$ to the core radius $R_i$ equals 1.55. The crest angle $\Delta\phi_K=20°$. The active associated angle of intersection $\alpha_a=5°$. The passive angle of intersection $\alpha_p=20°$. The associated wedges $K_a$ and $K_p$ can thus be flexibly adapted to the plastics material to be processed. With regard to the further mode of functioning and construction, reference is made to the previous embodiments.

Figure 21:
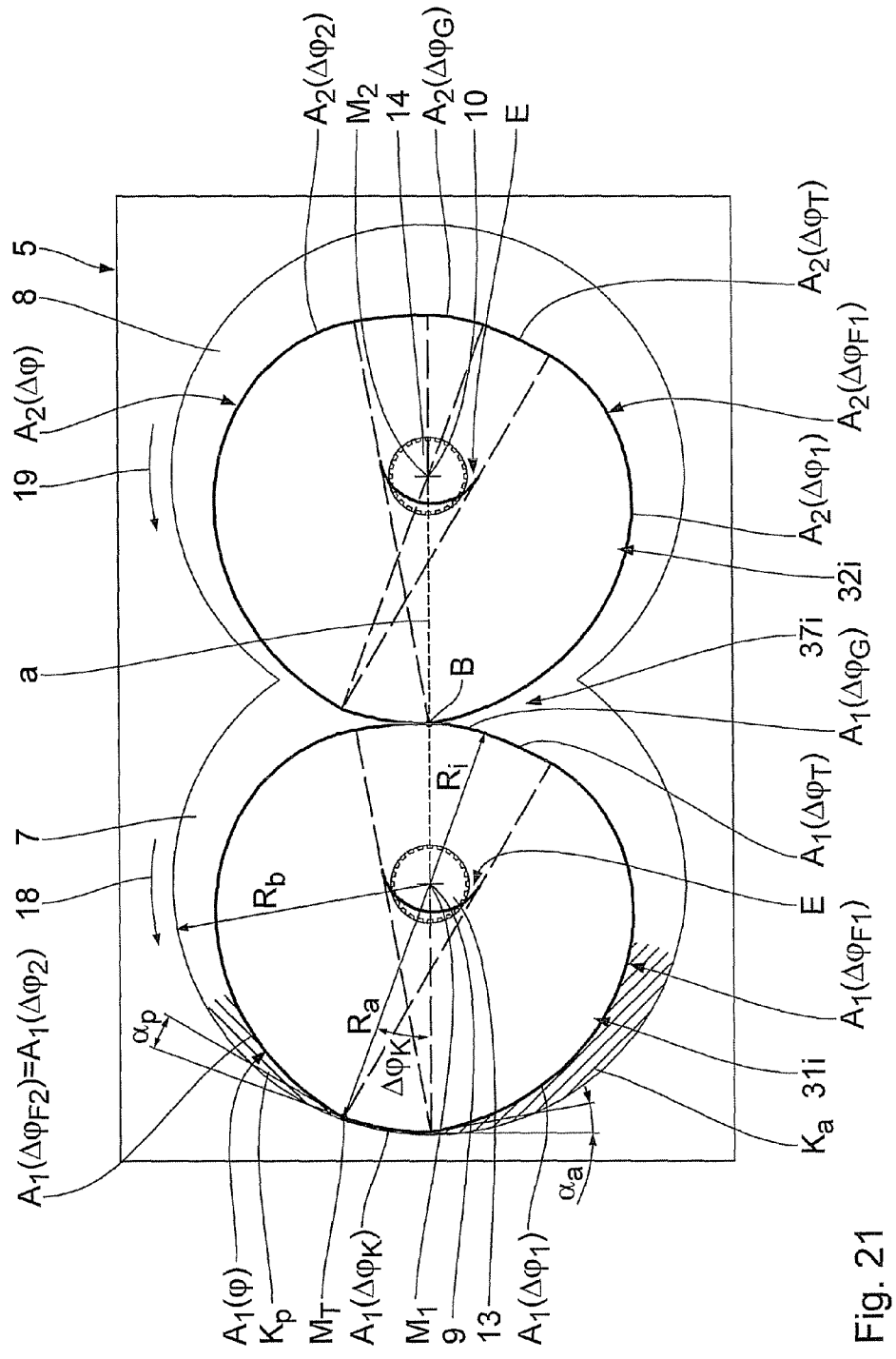
FIG. 21 shows a vertical cross section according to FIG. 3 with treatment elements according to a tenth embodiment.

A tenth embodiment of the invention will be described below with reference to FIG. 21. The kneading elements 31i and 32*i* are configured in accordance with the fourth embodiment and have an evolute E, which is continuous and differentiable curve in the form of a circular arc. The ratio of the outer radius $R_a$ to the core radius $R_i$ equals 1.55. The crest angle $\Delta\phi_K=20°$. The active angle of intersection $\alpha_a=10°$. The passive angle of intersection $\alpha_p=10°$. Because of the same angles $\alpha_a$ and $\alpha_p$ of intersection, the kneading elements 31*i* and 32*i* are congruent and symmetrical. The associated wedges $K_a$ and $K_p$ are configured the same. With regard to the further mode of functioning and construction, reference is made to the previous embodiments.

Figure 22:
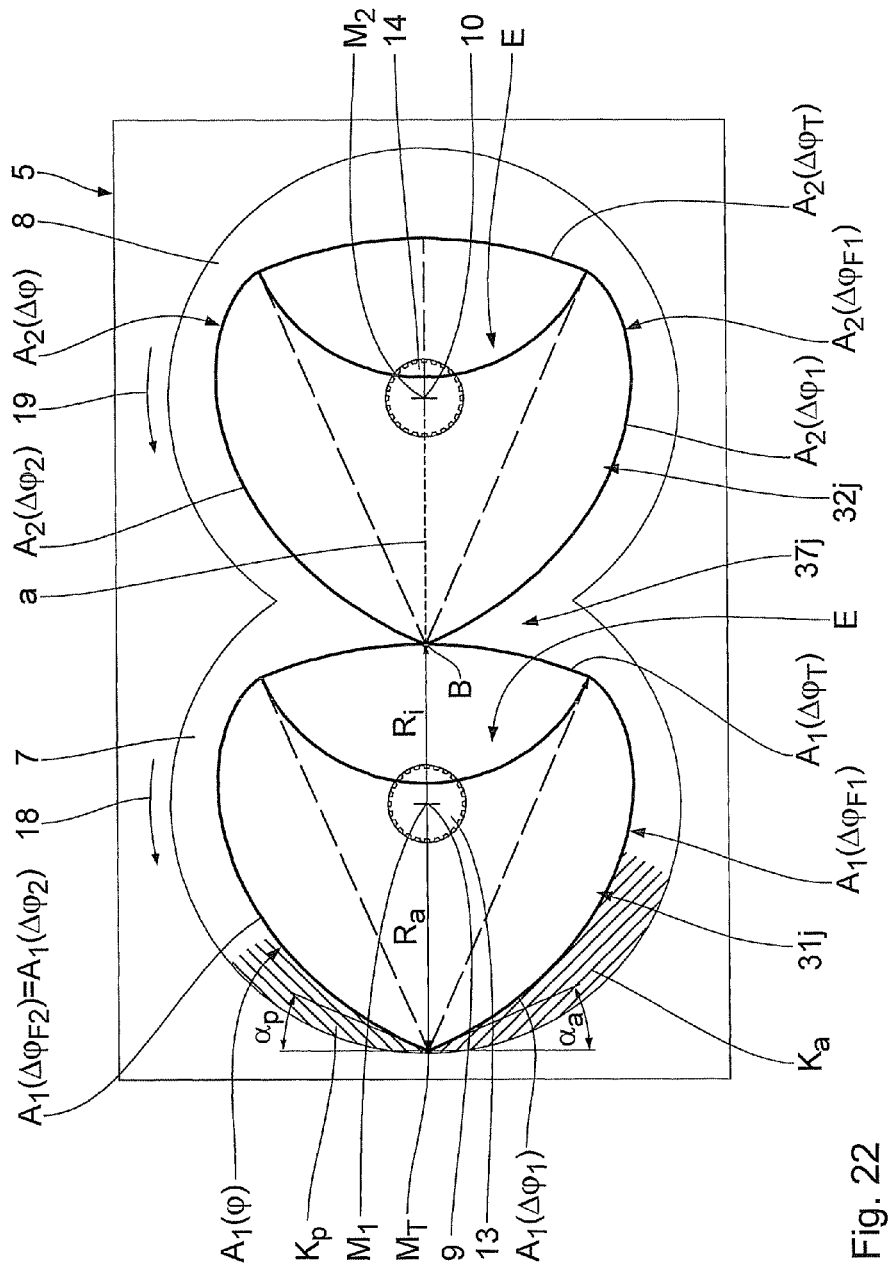
FIG. 22 shows a vertical cross section according to FIG. 3 with treatment elements according to an eleventh embodiment.

An eleventh embodiment of the invention will be described below with reference to FIG. 22. The kneading elements 31*j* and 32*j* are configured in accordance with the fourth embodiment and have an evolute E and a continuous and differentiable curve in the form of a circular arc. The ratio of the outer radius $R_a$ to the core radius $R_i$ equals 1.55. The crest angle $\Delta\phi_K=0°$. The crest $A(\Delta\phi_K)$ therefore degenerates to a single point, the centre point $M_T$. The angle $\alpha_a$ of intersection associated with the active flank $A(\Delta\phi_{F1})$ is maximal. The angle $\alpha_p$ of intersection associated with the passive flank $A(\Delta\phi_{F2})$ is also maximal. Because of the same angles $\alpha_a$ and $\alpha_p$ of intersection, the kneading elements 31*j* and 32*j* are congruent and symmetrical. The associated wedges $K_a$ and $K_p$ can thus be flexibly adapted to the plastics material to be processed. With regard to the further mode of functioning and construction, reference is made to the previous examples.

Figure 23:
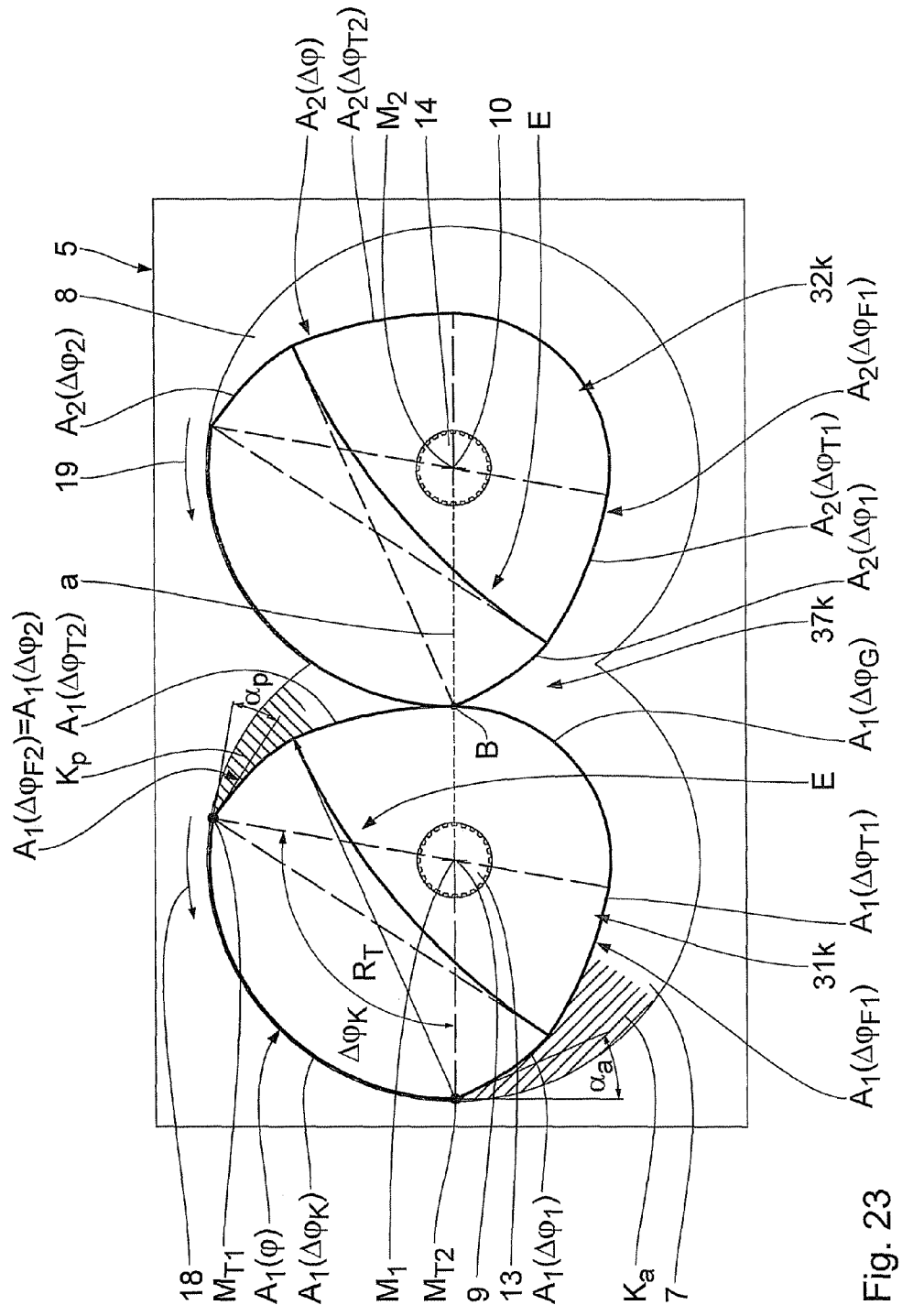
FIG. 23 shows a vertical cross section according to FIG. 3 with treatment elements according to a twelfth embodiment.

A twelfth embodiment of the invention will be described below with reference to FIG. 23. The kneading elements 31*k* and 32*k* are configured in accordance with the fourth embodiment and have an evolute E and a continuous and differentiable curve in the form of a circular arc. The ratio of the outer radius $R_a$ to the core radius $R_i$ equals 1.55. The crest angle $\Delta\phi_K=100°$. The active angle $\alpha_a$ of intersection is maximal. The passive angle $\alpha_p$ of intersection is also maximal. Because of the same angles $\alpha_a$ and $\alpha_p$ of intersection, the kneading elements 31*k* and 32*k* are congruent and symmetrical. The passive flank $A(\Delta\phi_{F2})$ is formed from the outer contour portion $A(\Delta\phi_2)$ and a further transition portion $A(\Delta\phi_{T2})$, in contrast to the previous embodiments. The second transition portion $A(\Delta\phi_{T2})$ is produced as a circular arc about the centre point $M_{T2}$ with the transition radius $R_T$, which corresponds to the axial spacing a. The associated wedges $K_a$ and $K_p$ may thus be flexibly adapted to the plastics material to be processed.

Reference is made to the previous embodiments with regard to the further mode of functioning and construction.

Figure 24:
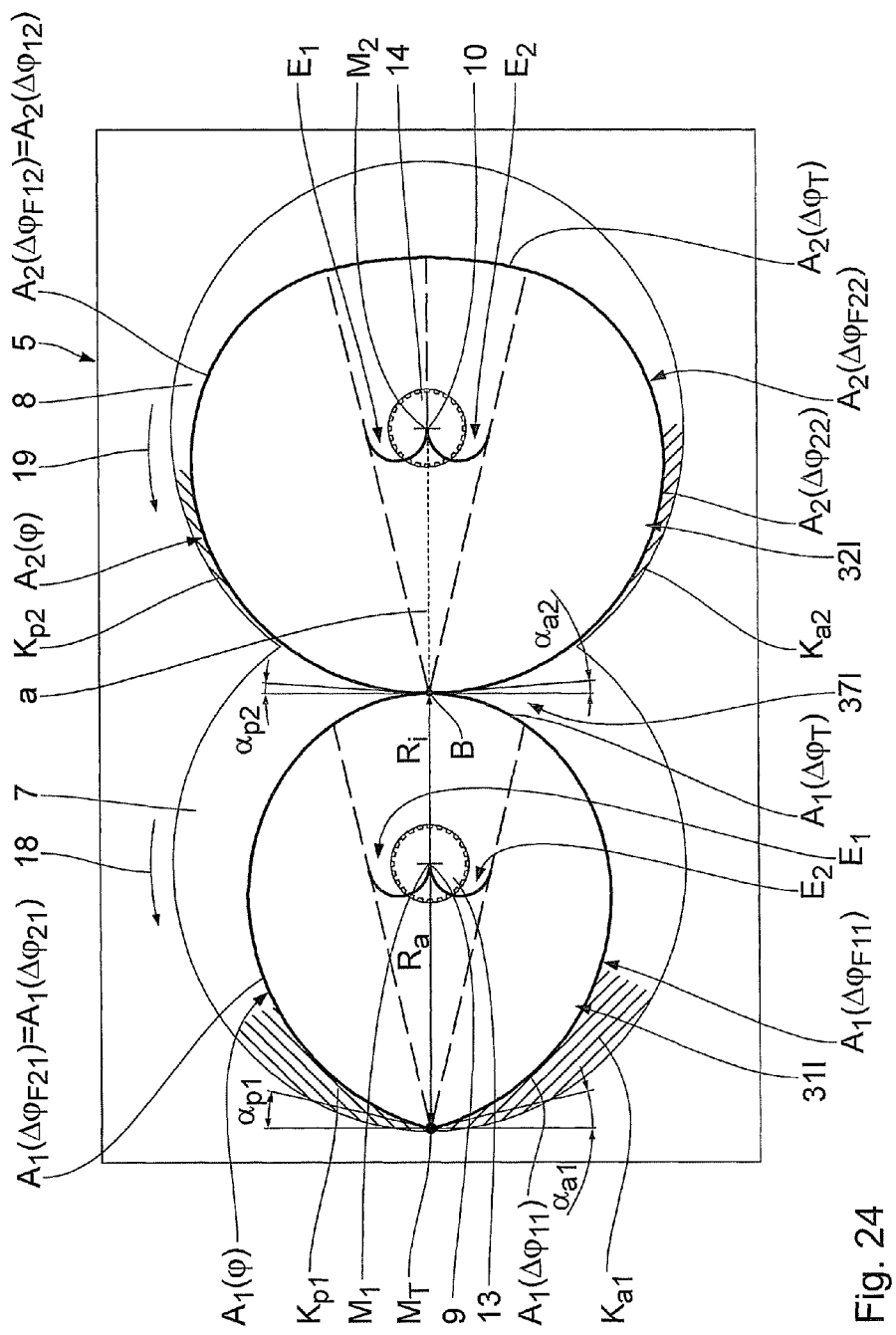
FIG. 24 shows a vertical cross section according to FIG. 3 with treatment elements according to a thirteenth embodiment.

A thirteenth embodiment of the invention will be described below with reference to FIG. 24. The kneading elements 31*l* and 32*l* have two evolutes $E_1$ and $E_2$, which are configured in accordance with the fourth embodiment and are a continuous and differentiable curve in the form of a circular arc. The kneading elements 31*l* and 32*l* are accordingly not congruent, but symmetrical. The ratio of the outer radius $R_a$ to the core radius $R_i$ equals 1.55. The crest angle $\Delta\phi_K=0°$. The crest $A(\Delta\phi K)$ therefore degenerates to a single point, the centre point $M_T$. The angles $\alpha_{a1}$ and $\alpha_{p1}$ and $\alpha_{a2}$ and $\alpha_{p2}$ of intersection are the same, so the same wedges $K_{a1}$ and $K_{p1}$ and $K_{a2}$ and $K_{p2}$ are produced. With regard to the further mode of functioning and construction reference is made to the previous embodiments.

Figure 25:
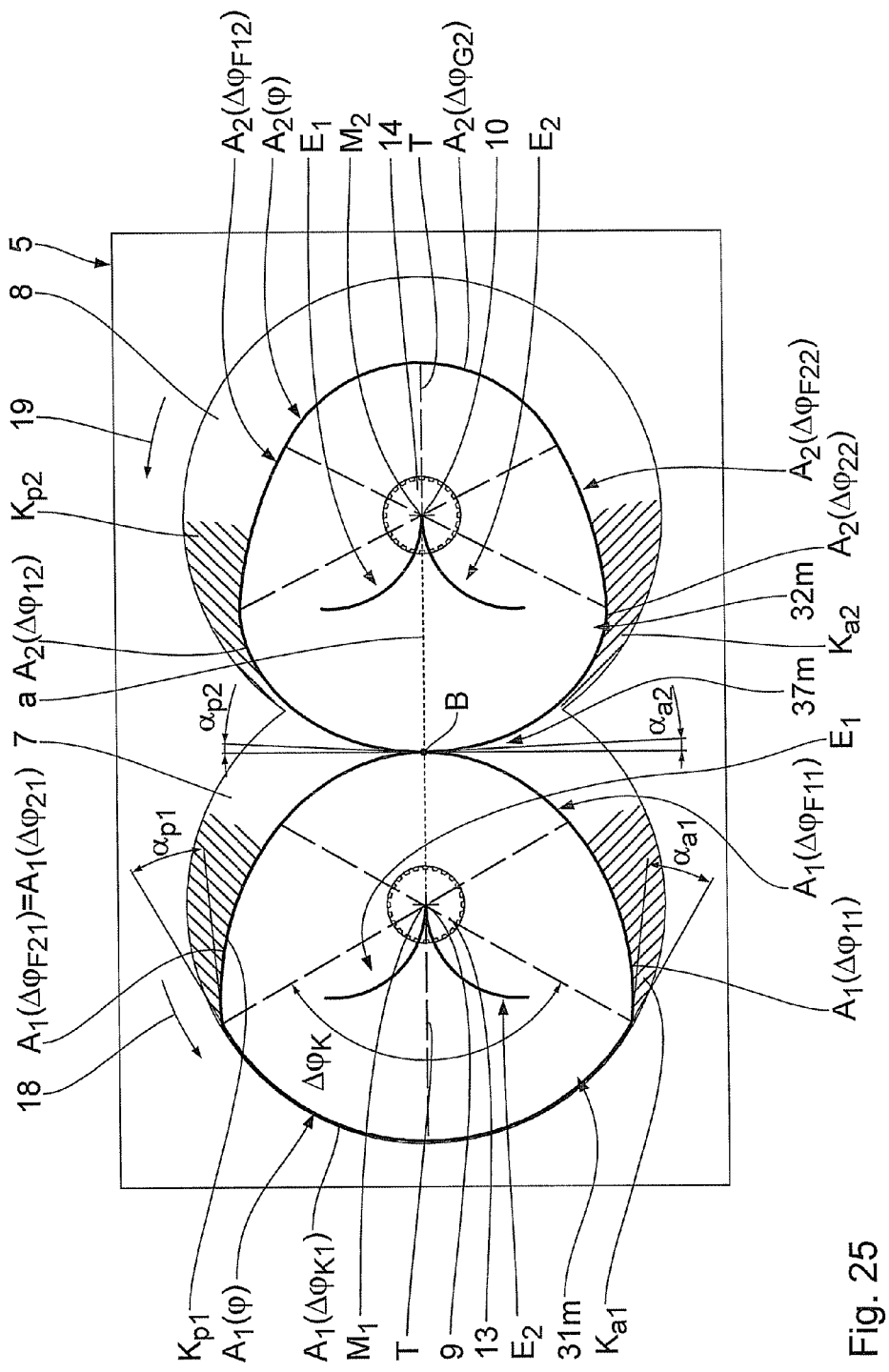
FIG. 25 shows a vertical cross section according to FIG. 3 with treatment elements according to a fourteenth embodiment.

A fourteenth embodiment of the invention will be described below with reference to FIG. 25. The kneading elements 31*m* and 32*m* have two evolutes $E_1$ and $E_2$, which are configured in accordance with the fourth embodiment and are a continuous and differentiable curve in the form of a circular arc. The kneading elements 31*m* and 32*m* are accordingly not congruent, but symmetrical. The ratio of the outer radius $R_a$ to the core radius $R_i$ equals 1.55. The crest angle $\Delta\phi_K=120°$. The angles $\alpha_{a1}$ and $\alpha_{p1}$ and $\alpha_{a2}$ and $\alpha_{p2}$ of intersection are the same, so the same wedges $K_{a1}$ and $K_{p1}$ and $K_{a2}$ and $K_{p2}$ are produced. The evolutes $E_1$ and $E_2$ have a common tangent T, so the outer contour portions $A_1(\Delta\phi_{11})$ and $A_1(\Delta\phi_{21})$ and $A_2(\Delta\phi_{12})$ and $A_2(\Delta\phi_{22})$ pass into one another in a continuous and differentiable manner. With regard to the further mode of functioning and construction, reference is made to the previous embodiments.

Figure 26:
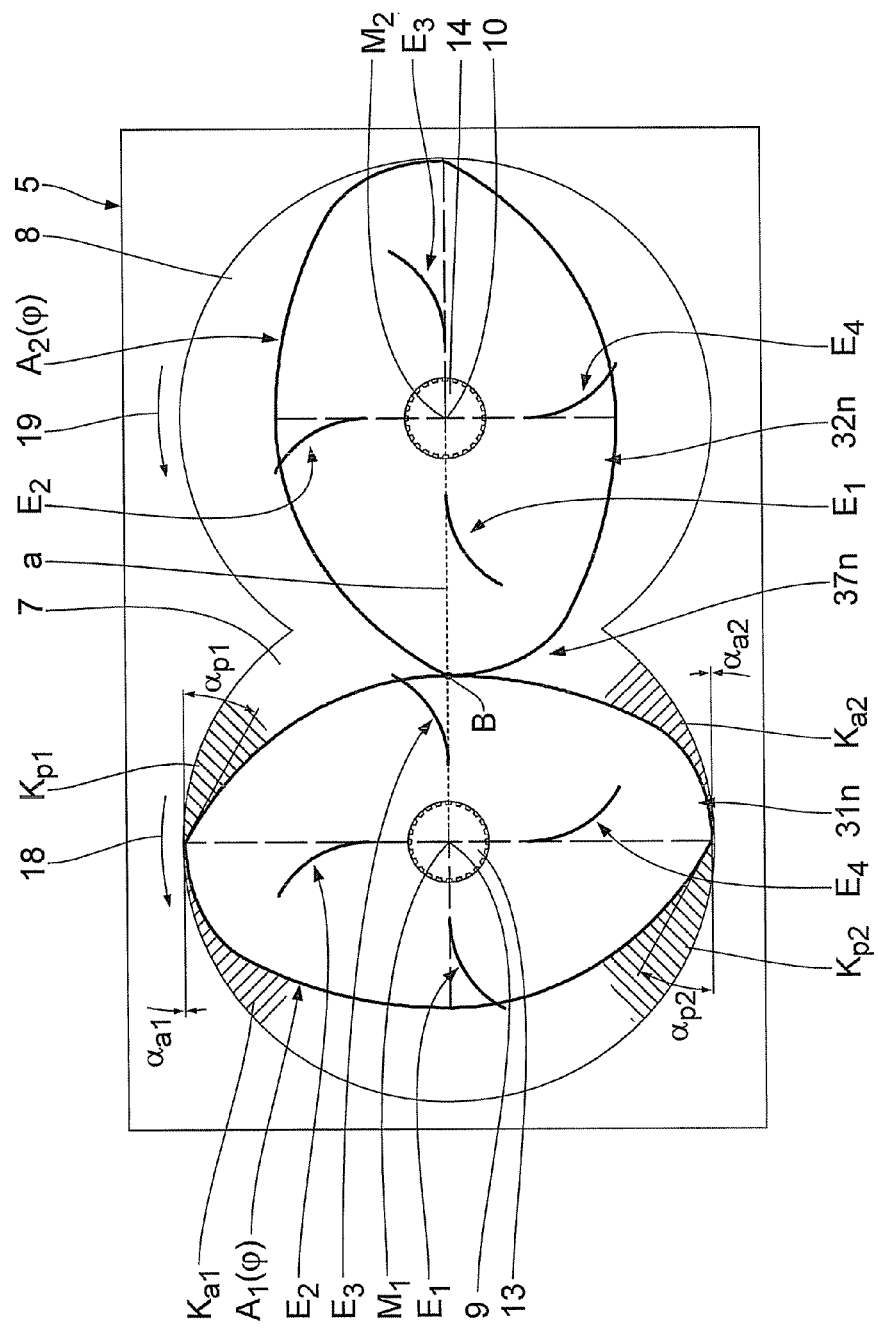
FIG. 26 shows a vertical cross section according to FIG. 3 with two-threaded treatment elements according to a fifteenth embodiment.
Figure 27:
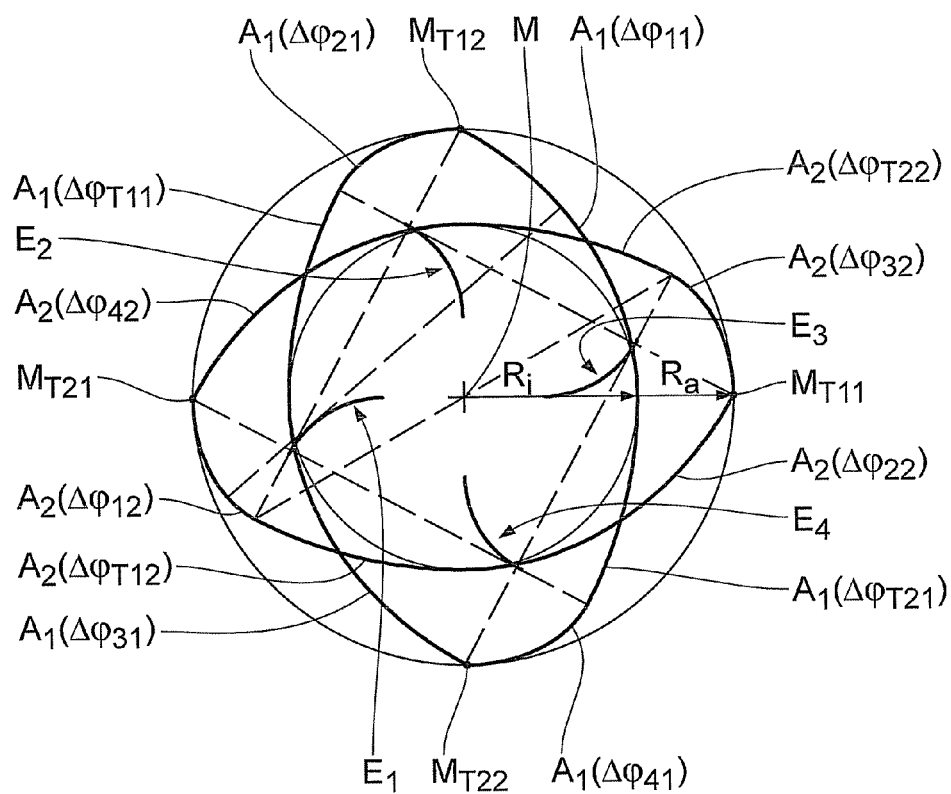
FIG. 27 shows a construction diagram to illustrate the construction steps of the treatment elements in FIG. 26.

A fifteenth embodiment of the invention will be described below with reference to FIGS. 26 and 27. The kneading elements 31*n* and 32*n* are two-threaded. The kneading elements 31*n* and 32*n* have four evolutes $E_1$ to $E_4$, which are continuous and differentiable curves in the form of circular arcs. The kneading elements 31*n* and 32*n* are congruent. The outer contour $A_1(\phi)$ of the kneading element 31*n* is composed of the outer contour portion $A_1(\Delta\phi_{11})$ unwound on the evolute $E_1$, the outer contour portion $A_1(\Delta\phi_{21})$ unwound on the evolute $E_2$, the transition portion $A_1(\Delta\phi_{T11})$ about the centre point $M_{T11}$, the outer contour portion $A_1(\Delta\phi_{31})$ unwound on the evolute $E_3$, the outer contour portion $A_1(\Delta\phi_{41})$ unwound on the evolute $E_4$ and the transition portion $A_1(\Delta\phi_{T21})$ about the centre point $M_{T21}$. The outer contour $A_2(\phi_2)$ of the kneading element 32*n* is produced with the aid of the evolutes $E_1$ to $E_4$ accordingly, wherein the transition portions $A_2(\Delta\phi_{T12})$ and $A_2(\Delta\phi_{T22})$ have the centre points $M_{T12}$ and $M_{22}$. The active angles $\alpha_{a1}$ and $\alpha_{a2}$ of intersection equal 0°. The passive angles $\alpha_{p1}$ and $\alpha_{p2}$ of intersection are the same and greater than 0°. Accordingly, the active wedges $K_{a1}$ and $K_{a2}$ and the passive wedges $K_{p1}$ and $K_{p2}$ are the same. With regard to the further mode of functioning and construction, reference is made to the previous embodiments.

Figure 28:
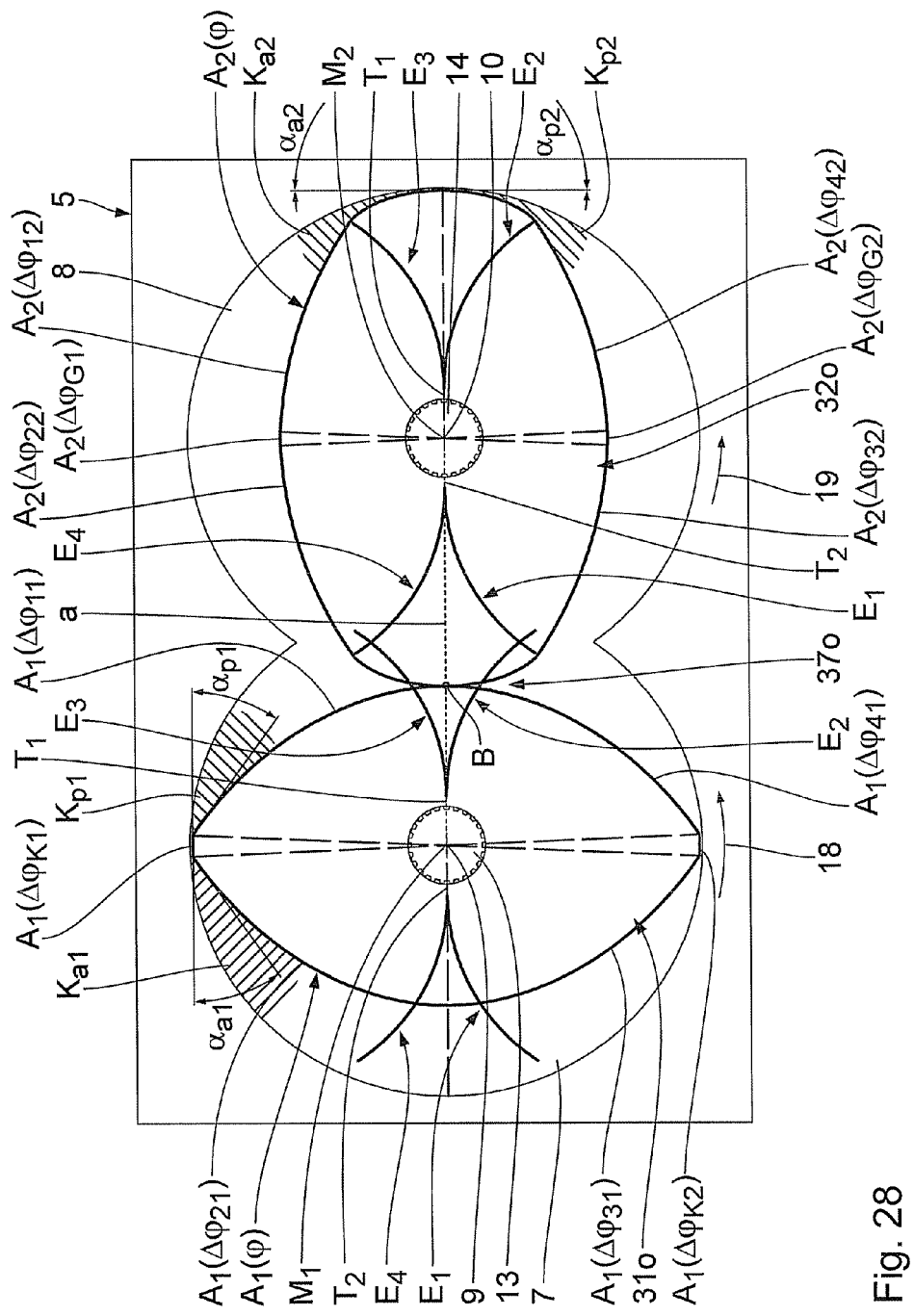
FIG. 28 shows a vertical cross section according to FIG. 3, with two-threaded treatment elements according to a sixteenth embodiment.

A sixteenth embodiment of the invention will be described below with reference to FIG. 28. The kneading elements 31*o* and 32*o* are two-threaded in accordance with the fifteenth embodiment and have four evolutes $E_1$ to $E_4$ in the form of circular arcs. The kneading elements 31*o* and 32*o* are not congruent, but symmetrical. The outer contour $A_1(\phi)$ of the treatment element 31*o* is composed of the outer contour portion $A_1(\Delta\phi_{11})$ unwound on the evolute $E_1$, the crest $A_1(\Delta\phi_{K1})$ about the centre point $M_1$, the outer contour portion $A_1(\Delta\phi_{21})$ unwound on the evolute $E_2$, the outer contour portion $A_1(\Delta\phi_{31})$ unwound on the evolute $E_3$, the crest $A_1(\Delta\phi_{K2})$ about the centre point $M_1$ and the outer contour portion $A_1(\Delta\phi_{41})$ unwound on the evolute $E_4$. The evolutes $E_2$ and $E_3$ and $E_1$ and $E_4$ in each case have a common tangent $T_1$ and $T_2$, so the outer contour portions $A_1(\Delta\phi_{21})$ and $A_1(\Delta\phi_{31})$ and $A_1(\Delta\phi_{41})$ and $A_1(\Delta\phi_{11})$ pass into one another in a continuous and differentiable manner. The outer contour $A_2(\phi)$ of the treatment element 32*o* is formed in accordance with the evolutes $E_1$ to $E_4$, the outer contour portions $A_2(\Delta\phi_{12})$ and $A_2(\Delta\phi_{22})$ being connected by the base $A_2(\Delta\phi_{G1})$ and the outer contour portions $A_2(\Delta\phi_{32})$ and $A_2(\Delta\phi_{42})$ by the base $A_2(\Delta\phi_{G2})$. The active angle $\alpha_{a1}$ of intersection and the passive angle $\alpha_{p1}$ of intersection of the treatment element 31*o* are about 33°. The active angle $\alpha_{a2}$ of intersection and the passive angle $\alpha_{p2}$ of intersection of the treatment element 32*o* are 0°. Consequently, the wedges $K_{a1}$ and $K_{p1}$ are the same. The same applies to the wedges $K_{a2}$ and $K_{p2}$. With regard to the further mode of functioning and construction, reference is made to the previous embodiments.

Figure 29:
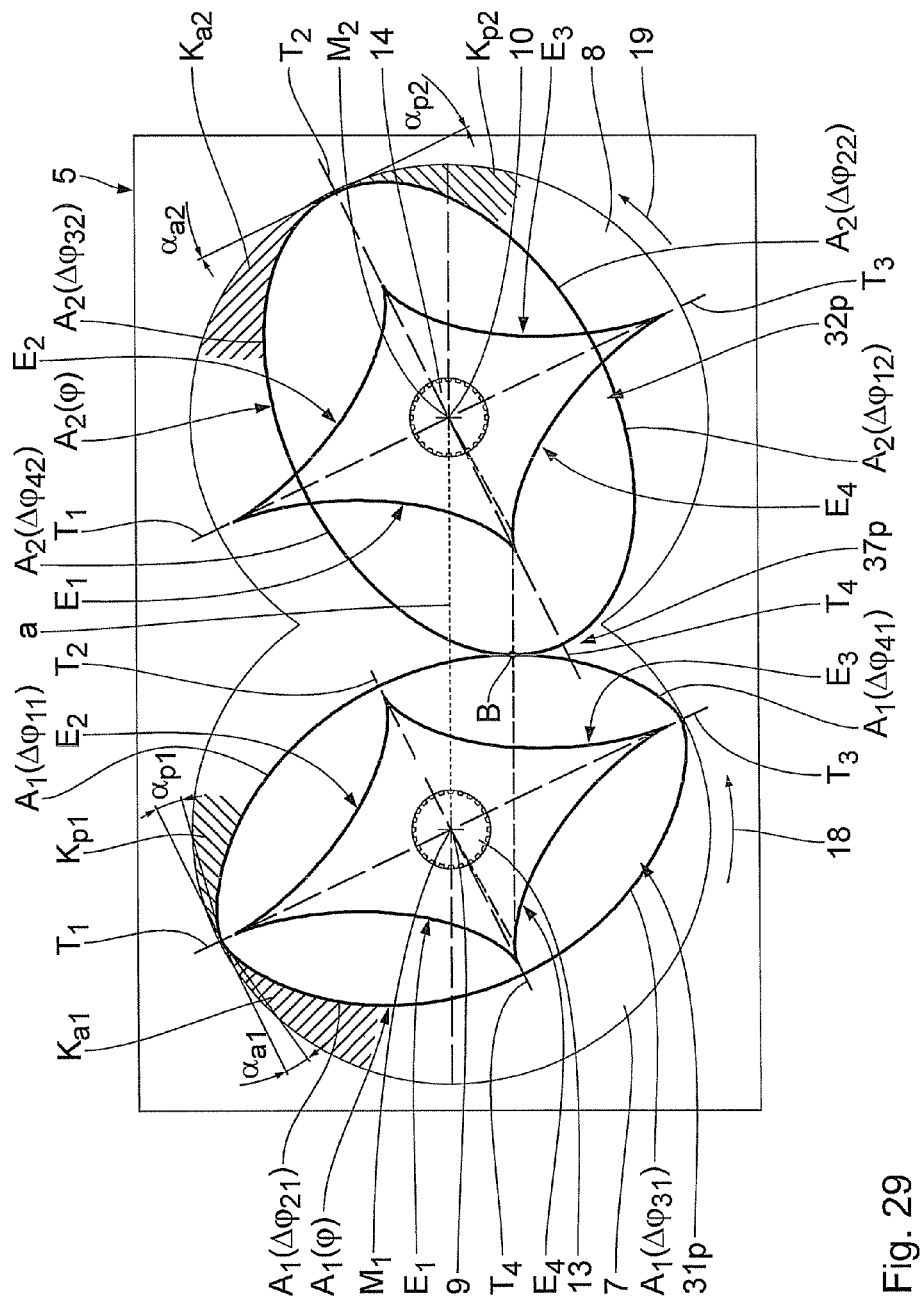
FIG. 29 shows a vertical cross section according to FIG. 3, with two-threaded treatment elements according to a seventeenth embodiment.

With reference to FIG. 29, a seventeenth embodiment of the invention will be described below. The kneading elements 31*p* and 32*p* are two-threaded. The kneading elements 31*p* and 32*p* are not congruent, but symmetrical. The kneading elements 31*p* and 32*p* have four evolutes $E_1$ to $E_4$, which are, in each case, continuous and differentiable curves. The evolutes $E_1$ to $E_4$ form an astroid, which can be described by the following equations:

$$x = c \cdot (\cos(t))^n$$

$$y = d \cdot (\sin(t))^n$$

with the factors c and d and the exponent n, wherein c>d and n=3. The outer contour $A_1(\phi)$ of the kneading element 31p is composed of the outer contour portion $A_1(\Delta\phi_{11})$ unwound on the evolute $E_1$, the outer contour portion $A_1(\Delta\phi_{21})$ unwound on the evolute $E_2$, the outer contour portion $A_1(\Delta\phi_{31})$ unwound on the evolute $E_3$ and the outer contour portion $A_1(\Delta\phi_{41})$ unwound on the evolute $E_4$. The evolutes $E_1$ to $E_4$ in each case have, pair-wise, common tangents $T_1$ to $T_4$, so the outer contour portions $A_1(\Delta\phi_{11})$ to $A_1(\Delta\phi_{41})$ pass into one another in a continuous and differentiable manner. The outer contour $A_2(\phi)$ of the kneading element 32p is comprised accordingly. The active angle $\alpha_{a1}$ of intersection and passive angle $\alpha_{p1}$ of intersection of the kneading element 31p are the same, so the wedges $K_{a1}$ and $K_{p1}$ are also the same. The same applies to the active angle $\alpha_{a2}$ of intersection and passive angle $\alpha_{p2}$ of intersection and the corresponding wedges $K_{a2}$ and $K_{p2}$ of the kneading element 32p. The angles $\alpha_{a2}$ and $\alpha_{p2}$ of intersection are, however, smaller than the angles $\alpha_{a1}$ and $\alpha_{p1}$ of intersection. The crests and bases of the kneading elements 31p and 32p are degenerated to single points. With regard to the further mode of functioning and construction, reference is made to the previous embodiments.

Figure 30:
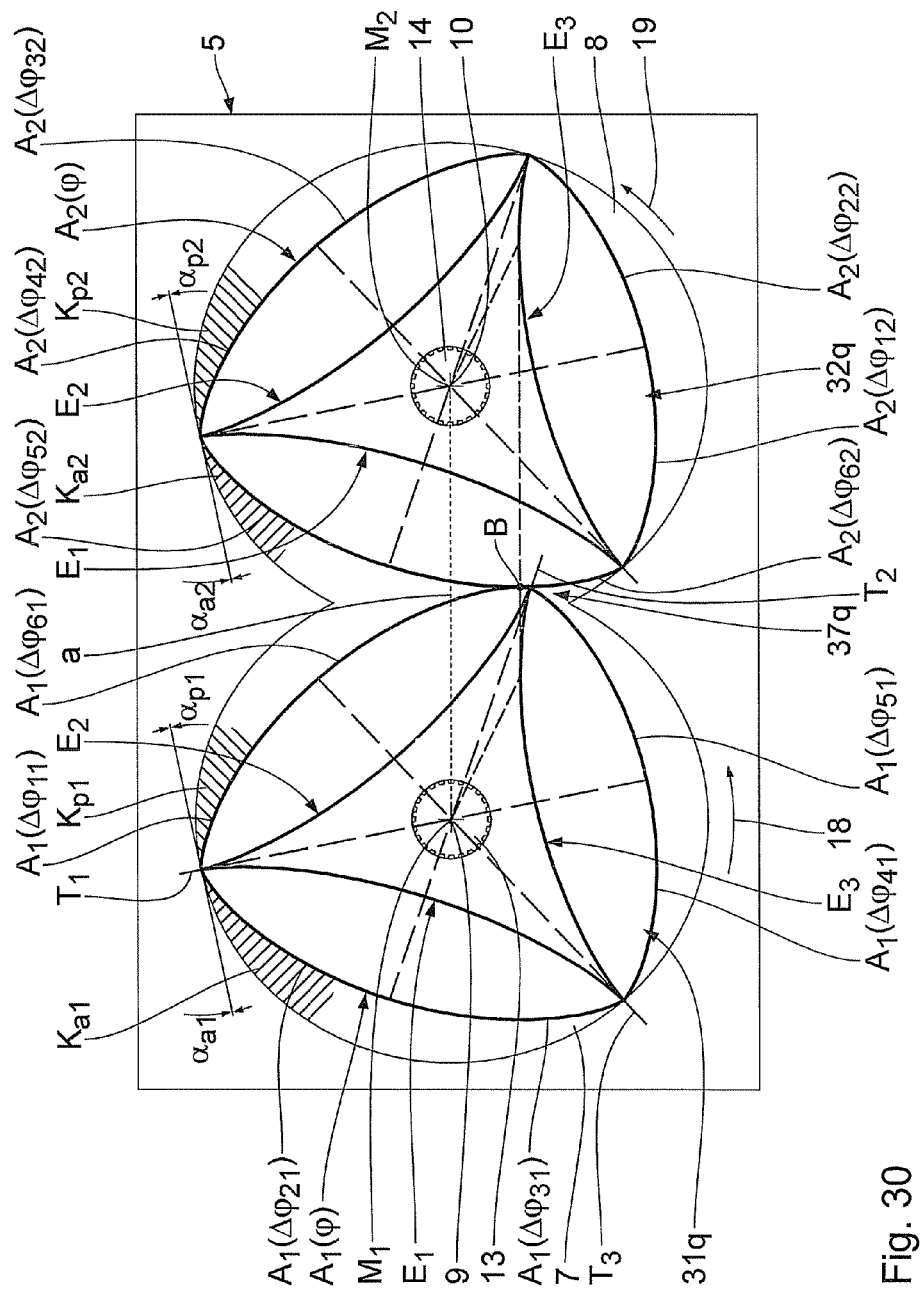
FIG. 30 shows a vertical cross section according to FIG. 3, with three-threaded treatment elements according to an eighteenth embodiment.

An eighteenth embodiment will be described below with reference to FIG. 30. The kneading elements 31q and 32q are triple-threaded. The kneading elements 31q and 32q are congruent and symmetrical. They have three evolutes $E_1$ to $E_3$, which are in each case continuous and differentiable curves and together form a tricuspoid. The outer contour $A_1(\phi)$ of the kneading element 31q is composed of the outer contour portion $A_1(\Delta\phi_{11})$ unwound on the evolute $E_1$, the outer contour portion $A_1(A_{T21})$ unwound on the evolute $E_2$, the outer contour portion $A_1(\Delta\phi_{31})$ unwound on the evolute $E_3$ and the outer contour portions $A_1(\Delta\phi_{41})$ to $A_1(\Delta\phi_{61})$ formed with a corresponding unwinding process. As the evolutes $E_1$ to $E_3$ in each case have, pair-wise, a common tangent $T_1$ to $T_3$, the outer contour portions $A_1(\Delta\phi_{11})$ to $A_1(\Delta\phi_{61})$ pass into one another in a continuous and differentiable manner. The active angles $\alpha_{a1}$ and $\alpha_{a2}$ of intersection and the passive angles $\alpha_{p1}$ and $\alpha_{p2}$ of intersection are the same size, so corresponding wedges $K_{a1}$, $K_{a2}$, $K_{p1}$ and $K_{p2}$ are produced. The outer contour $A_2(\phi)$ of the kneading element 32q is formed in accordance with the kneading element 31q. With regard to the further functioning and construction, reference is made to the previous embodiments.

Figure 31:
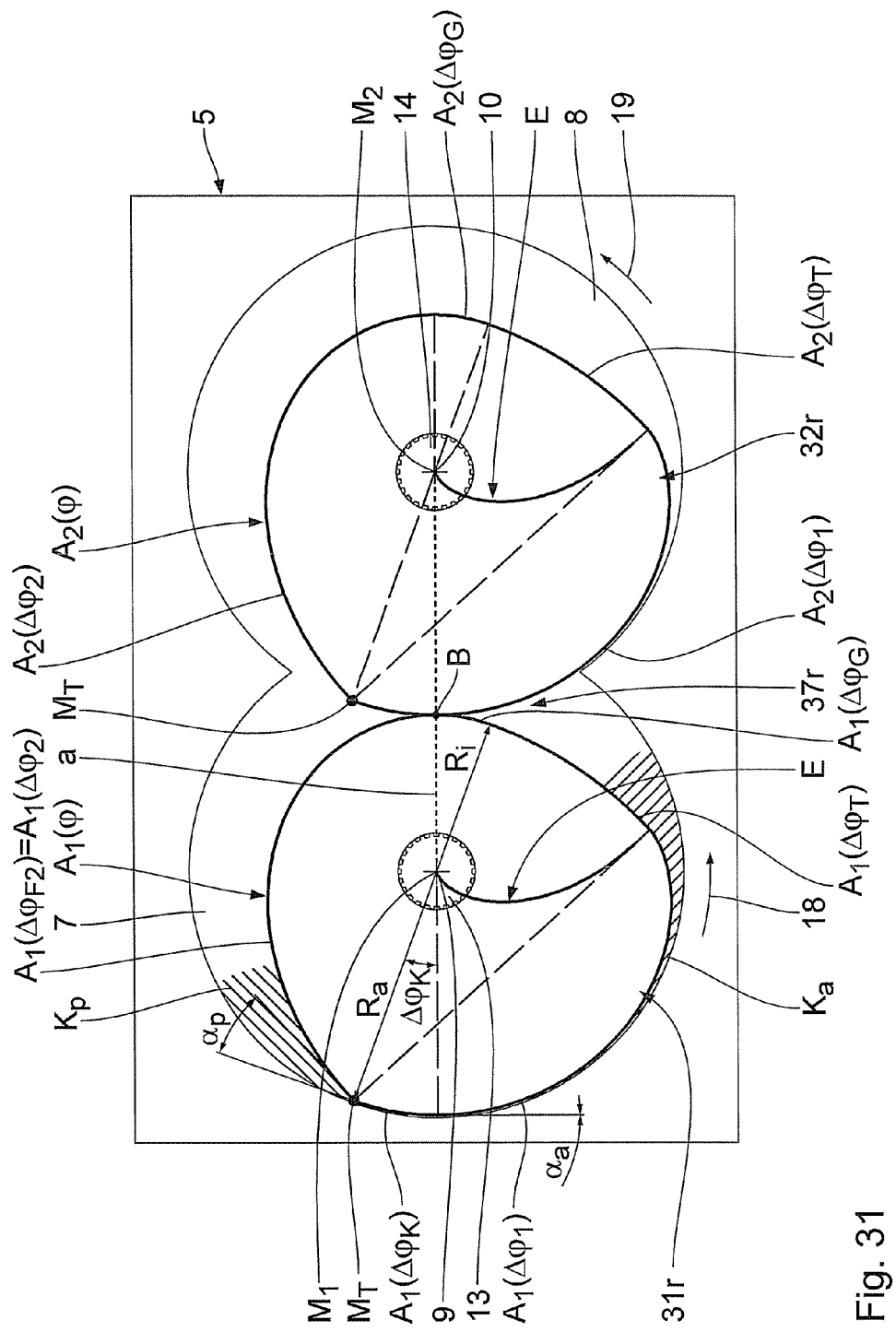
FIG. 31 shows a vertical cross section according to FIG. 3, with single-threaded treatment elements according to a nineteenth embodiment.
Figure 32:
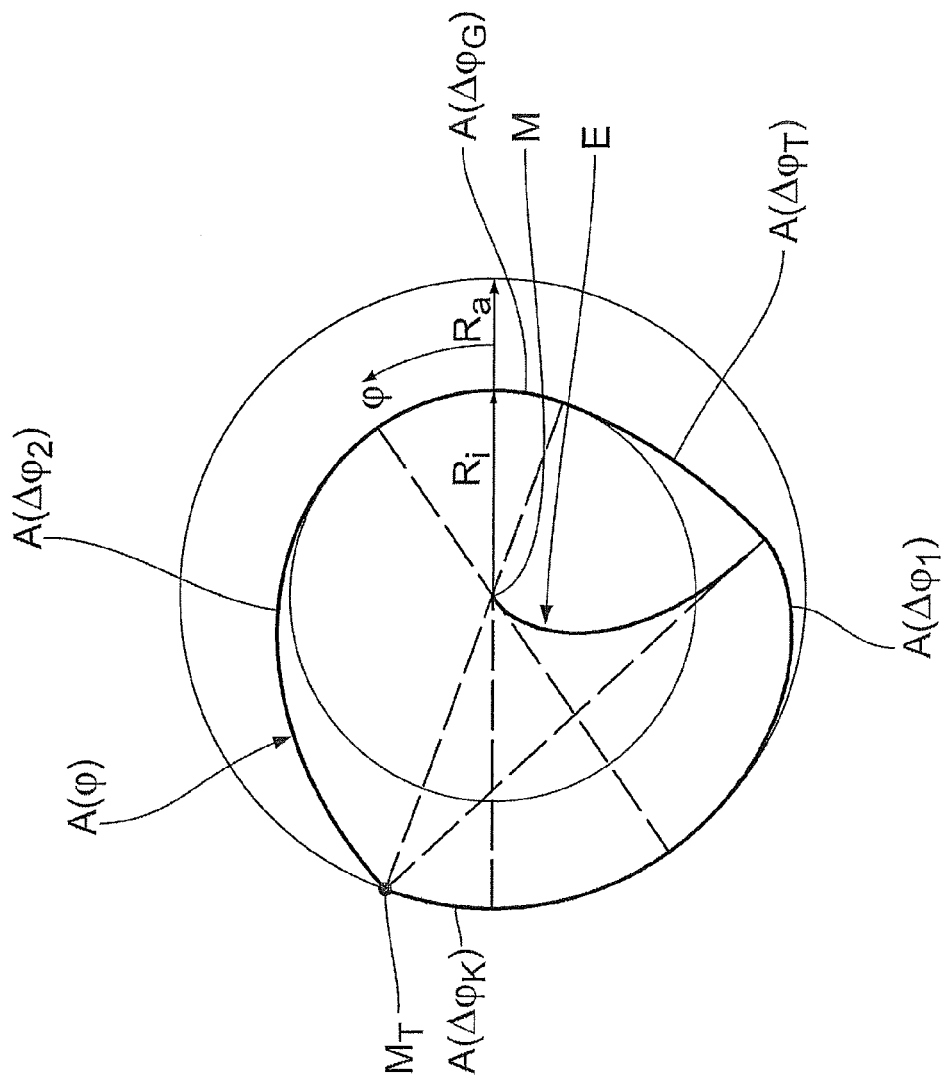
FIG. 32 shows a construction diagram to illustrate the construction steps of the treatment elements of FIG. 31.

A nineteenth embodiment of the invention will be described below with reference to FIGS. 31 and 32. The kneading elements 31r and 32r are single-threaded. They are congruent, but not symmetrical. The kneading elements 31r and 32r have an evolute E, which is a continuous and differentiable curve in the form of a spiral. The spiral can be described by the equation $$\rho = k \cdot t^n$$

wherein $\rho$ is the radius, k is a constant and t is the angle (in polar coordinates) of the spiral. The kneading elements 31r and 32r have a crest angle $\Delta\phi_K=20°$. The active angle of intersection $\alpha_a=0°$. The passive angle of intersection $\alpha_{p1}>0°$. The exponent n equals 2.5. The spiral-shaped evolute E is additionally rotated through 180°. With regard to the further mode of functioning and construction, reference is made to the previous embodiments, in particular the fourth embodiment.

Figure 33:
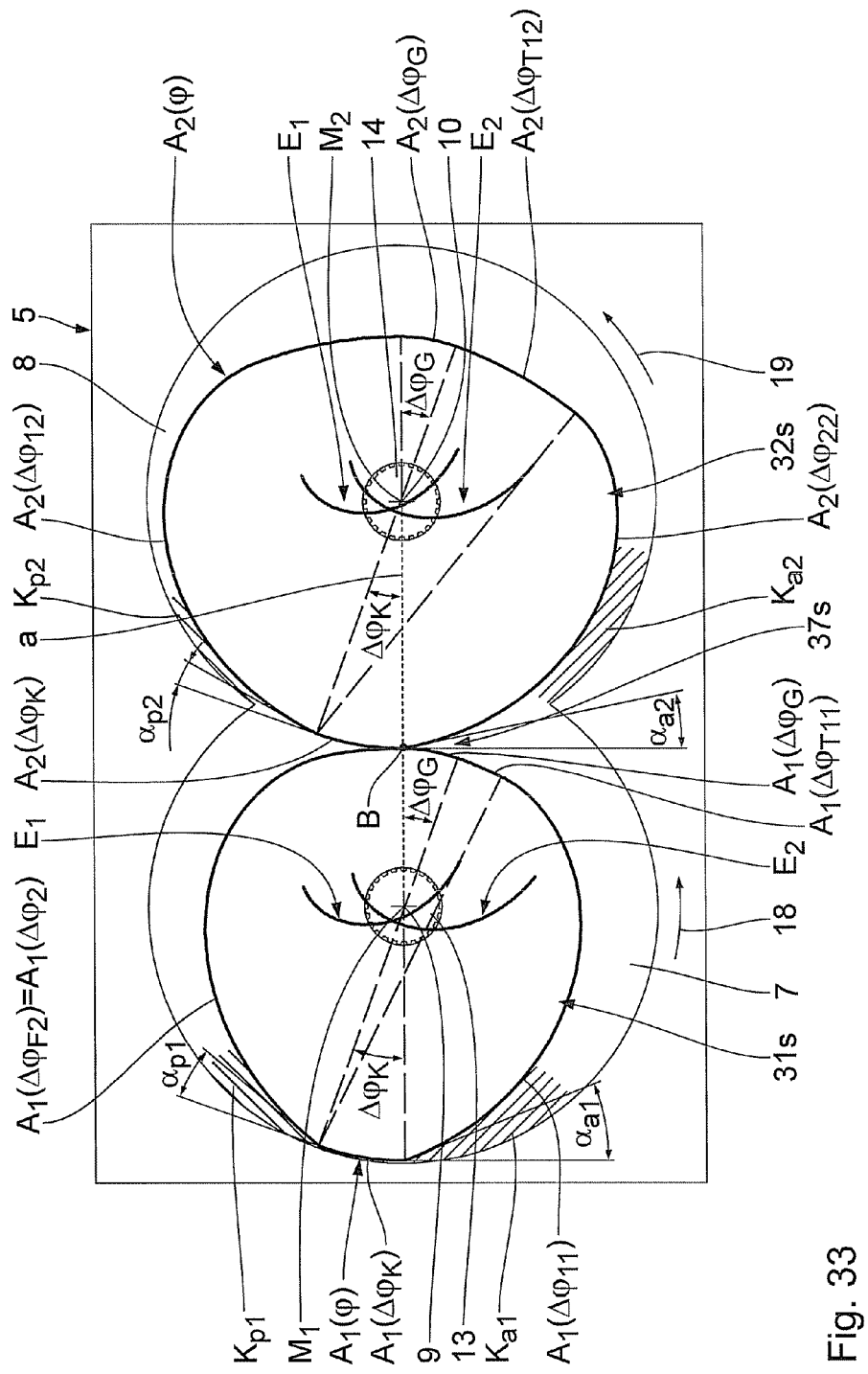
FIG. 33 shows a vertical cross section accord ng to FIG. 3, with single-threaded treatment elements according to a twentieth embodiment.
Figure 34:
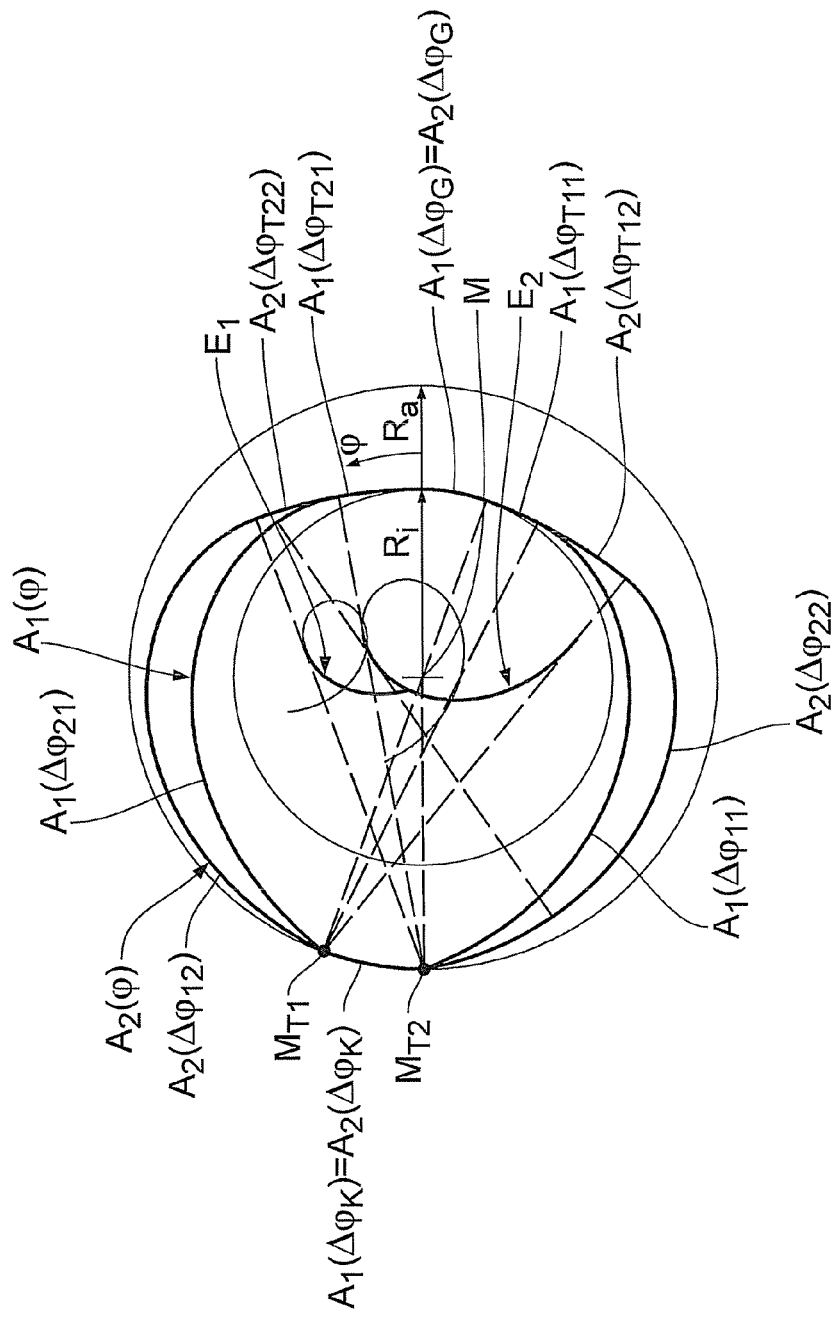
FIG. 34 shows a construction diagram to illustrate the construction steps of the treatment elements in FIG. 33.

A twentieth embodiment of the invention will be described below with reference to FIGS. 33 and 34. The kneading elements 31s and 32s are single-threaded and not congruent. The kneading elements 31s and 32s have two evolutes $E_1$ and $E_2$, which in each case form a continuous and differentiable curve in the form of a spiral. The crest angle $\Delta\phi_K=20°$. Accordingly, the base angle $\Delta\phi_G=20°$. The active angle of intersection $\alpha_{a1}=20°$. The active angle of intersection $\alpha_{a2}$ equals 10°. The exponent n=1.0. The spiral evolutes $E_1$ and $E_2$ are rotated through 120° and 100°. With regard to the further mode of functioning and construction, reference is made to the previous examples, in particular the third and nineteenth embodiments.

Figure 35:
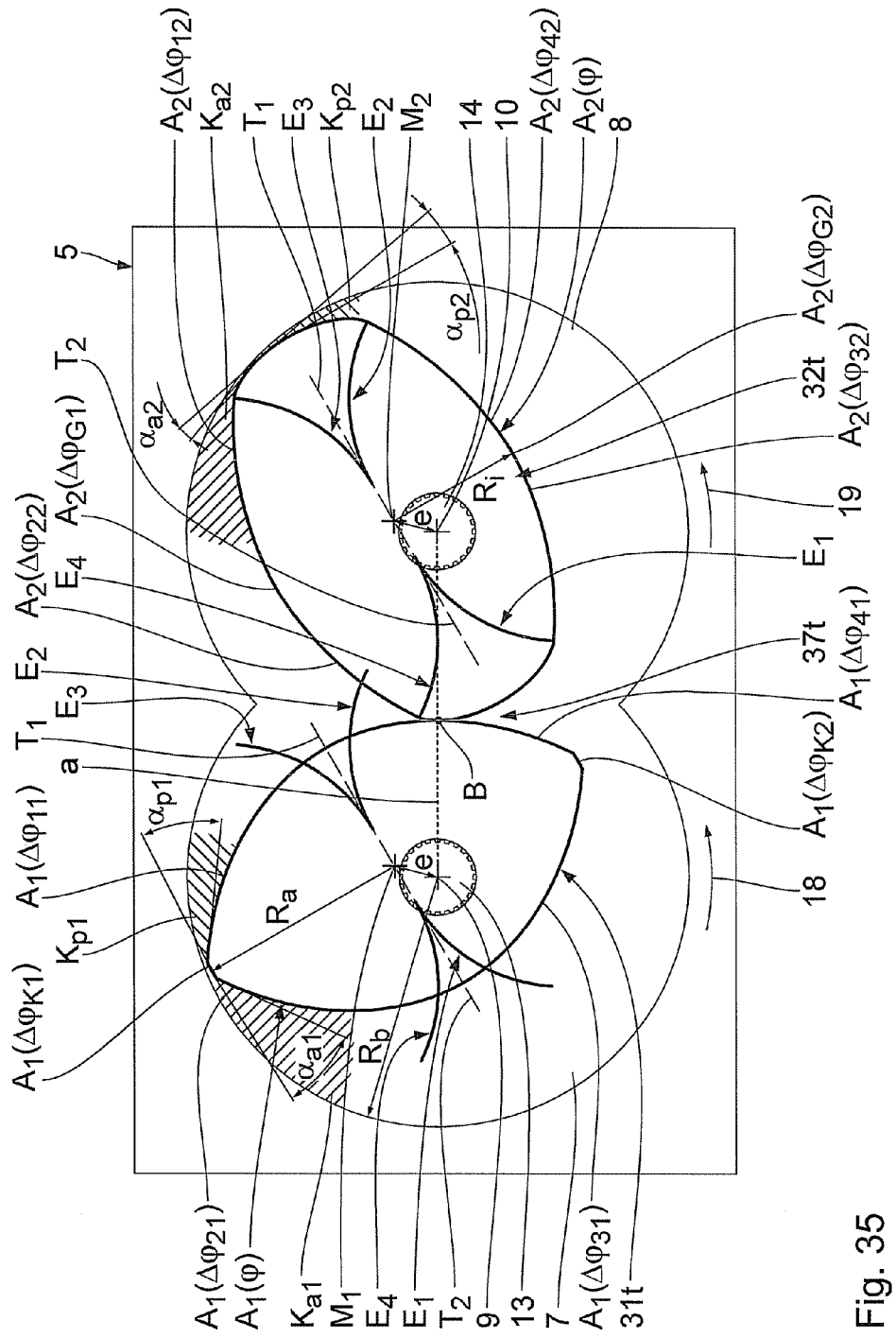
FIG. 35 shows a vertical cross section according to FIG. 28, with eccentrically arranged treatment elements according to a twenty first embodiment.

A twenty-first embodiment of the invention will be described below with reference to FIG. 35. The kneading elements 31t and 32t are configured in accordance with the sixteenth embodiment. In contrast to the previous embodiments, the kneading elements 31t and 32t with their longitudinal axes $M_1$ and $M_2$ are arranged eccentrically with respect to the associated rotational axes 9 and 10. The longitudinal axes $M_1$ and $M_2$ therefore have a spacing e from the associated rotational axes 9 and 10, which characterizes the eccentricity. Because of the eccentric arrangement, the shape of the wedges $K_{a1}$ and $K_{p1}$ or wedges $K_{a2}$ and $K_{p2}$ and the size of the angles $\alpha_{a1}$ and $\alpha_{p1}$ or $\alpha_{a2}$ and $\alpha_{p2}$ of intersection depend on the rotational position of the kneading elements 31t and 32t. The spacing e along the rotational axes 9, 10 may be constant or vary. Moreover, the angle at which the kneading elements 31t and 32t are eccentrically moved out may be constant or vary. With regard to the further mode of functioning, reference is made to the previous embodiments. In particular, the treatment elements 31, 32 to 31s, 32s described in the previous embodiments may also be eccentrically arranged in accordance with the twenty first embodiment.

The invention claimed is:

1. A treatment element for treating material in a multi-shaft worm machine, comprising
   a longitudinal axis M,
   a respective core radius $R_i$ having the longitudinal axis M as the centre point and an outer radius $R_a$,
   an outer contour $A(\phi)$ running about the longitudinal axis M, wherein
      $\phi$ is the angle about the longitudinal axis M and $R_i \leq D_A(\phi) \leq R_a$ applies to a spacing $D_A(\phi)$ of the outer contour $A(\phi)$ from the longitudinal axis M,
   wherein
   the outer contour $A(\phi)$ has at least one outer contour portion $A(\Delta\phi)$, which runs along an angle portion $\Delta\phi$,
      which has a continuously changing spacing $D_A(\Delta\phi)$ from the longitudinal axis M, wherein $R_i < D_A(\Delta\phi) < R_a$, and
      which has an associated evolute E,
         which is a quantity of n points P(i) where i=1 to n and n≥3,
         wherein each of the points P(i) lies outside the longitudinal axis M and within the outer radius $R_a$, and
         wherein two respective adjacent points P(i) and P(i+1) have the spacing $\Delta r(i)$ from one another, which is less than $R_i/2$.

2. A treatment element according to claim 1, wherein two respective adjacent points P(i) and P(i+1) have a spacing $\Delta r(i)$ from one another, which is less than $R_i/4$, the two respective adjacent points P(i) and P(i+1) belonging to adjacent involute curves E'(i) and E'(i+1).

3. A treatment element according to claim 1, wherein two respective adjacent points P(i) and P(i+1) have a spacing Δr(i) from one another, which is less than $R_i/6$, the two respective adjacent points P(i) and P(i+1) belonging to adjacent involute curves E'(i) and E'(i+1).

4. A treatment element according to claim 1, wherein two respective adjacent points P(i) and P(i+1) have a spacing Δr(i) from one another, which is less than $R_i/8$, the two respective adjacent points P(i) and P(i+1) belonging to adjacent involute curves E'(i) and E'(i+1).

5. A treatment element according to claim 1, wherein two respective adjacent points P(i) and P(i+1) have a constant spacing Δr from one another.

6. A treatment element according to claim 1, wherein the involute curves E'(i) belonging to the points P(i) in each case have an angle at centre Δε(i), which is less than 60°.

7. A treatment element according to claim 1, wherein the involute curves E'(i) belonging to the points P(i) in each case have an angle at centre Δε(i), which is less than 45°.

8. A treatment element according to claim 1, wherein the involute curves E'(i) belonging to the points P(i) in each case have an angle at centre Δε(i), which is less than 30°.

9. A treatment element according to claim 1, wherein the involute curves E'(i) belonging to the points P(i) have constant angles at centre Δε.

10. A treatment element according to claim 1, wherein the points P(i) lie on a continuous and differentiable curve, which has a direction of curvature that remains the same.

11. A treatment element according to claim 10, wherein the evolute E is equal to the curve, at least in portions.

12. A treatment element according to claim 1, wherein the at least one outer contour portion A(Δφ) is curved over the entire angle portion Δφ.

13. A treatment element according to claim 1, wherein the outer contour A(φ) has at least two outer contour portions A(φ$_1$) and A(φ$_2$).

14. A treatment element according to claim 1, wherein the outer contour A(φ) has at least four outer contour portions A(φ$_1$) to A(φ$_4$).

15. A treatment element according to claim 1, wherein the outer contour A(φ) has at least two outer contour portions A(Δφ$_j$) and A(Δφ$_{j+i}$), which have a common evolute E$_j$.

16. A treatment element according to claim 1, wherein the outer contour A(φ) has at least two outer contour portions A(Δφ$_j$) and A(Δφ$_{j+1}$) and the at least two associated evolutes E$_j$ and E$_{j+1}$ are different.

17. A treatment element according to claim 1, wherein the outer contour A(φ) has at least two outer contour portions A(Δφ$_j$) and A(Δφ$_{j+i}$) and the at least two associated evolutes E$_j$ and E$_{j+1}$ have a common tangent (T).

18. A treatment element according to claim 1, wherein the outer contour A(φ) has a uniform direction of curvature.

19. A treatment element according to claim 1, wherein the outer contour A(φ) is multi-threaded.

20. A treatment element according to claim 1, wherein the outer contour A(φ) is two-threaded.

21. A multi-shaft worm machine with
a housing,
at least two housing bores, which penetrate one another and are parallel to one another,
at least two shafts arranged concentrically in the housing bores,
which are rotatably drivable about associated rotational axes, and
which have an axial spacing a of the rotational axes,
a plurality of treatment elements for treating material,
which are non-rotatably arranged one behind the other in an axial direction on the at least two shafts, and
which are configured to tightly mesh with one another,
wherein
at least two treatment elements arranged directly next to one another are configured such that each treatment element comprises
a longitudinal axis M,
a respective core radius $R_i$ having the longitudinal axis M as the centre point and an outer radius $R_a$,
an outer contour A(φ) running about the longitudinal axis M, wherein
φ is the angle about the longitudinal axis M and $R_i \leq D_A(φ) \leq R_a$ applies to a spacing $D_A(φ)$ of the outer contour A(φ) from the longitudinal axis M,
wherein
the outer contour A(φ) has at least one outer contour portion A(Δφ), which runs along an angle portion Δφ,
which has a continuously changing spacing $D_A(φ)$ from the longitudinal axis M, wherein $R_i < D_A(Δφ) < R_a$, and
which has an associated evolute E,
which is a quantity of n points P(i) where i=1 to n and n≥3,
wherein each of the points P(i) lies outside the longitudinal axis M and within the outer radius $R_a$, and
wherein two respective adjacent points P(i) and P(i+1) have the spacing, and
the sum of the core radius $R_i$ and the outer radius $R_a$ substantially equals the axial spacing a.

22. A multi-shaft worm machine according to claim 21, wherein the at least two shafts arranged concentrically in the housing bores are rotatably drivable in the same direction.

23. A multi-shaft worm machine according to claim 21, wherein the evolutes E$_j$ of the treatment elements arranged next to one another are movable into one another by linear displacement in the direction of the axial spacing a.

24. A multi-shaft worm machine according to claim 23, wherein the linear displacement corresponds to the axial spacing a.

25. A multi-shaft worm machine according to claim 21, wherein the longitudinal axes M of the treatment elements arranged next to one another are arranged eccentrically with respect to the associated rotational axes.

* * * * *